United States Patent
Pawlowski et al.

(10) Patent No.: US 10,795,819 B1
(45) Date of Patent: Oct. 6, 2020

(54) MULTI-PROCESSOR SYSTEM WITH CONFIGURABLE CACHE SUB-DOMAINS AND CROSS-DIE MEMORY COHERENCY

(71) Applicant: Intel Corporation, Santa Clara, CA (US)

(72) Inventors: Robert Pawlowski, Beaverton, OR (US); Bharadwaj Krishnamurthy, Hillsboro, OR (US); Vincent Cave, Hillsboro, OR (US); Jason M. Howard, Portland, OR (US); Ankit More, San Mateo, CA (US); Joshua B. Fryman, Corvallis, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/453,670

(22) Filed: Jun. 26, 2019

(51) Int. Cl.
  *G06F 12/00* (2006.01)
  *G06F 12/0817* (2016.01)
  *G06F 12/0811* (2016.01)
  *G06F 9/38* (2018.01)
  *G06F 9/30* (2018.01)
  *G06F 12/0891* (2016.01)

(52) U.S. Cl.
  CPC ...... *G06F 12/0828* (2013.01); *G06F 9/30116* (2013.01); *G06F 9/30138* (2013.01); *G06F 9/3816* (2013.01); *G06F 12/0811* (2013.01); *G06F 12/0891* (2013.01)

(58) Field of Classification Search
  CPC .......................... G06F 12/0828; G06F 9/3816
  USPC ........................................................ 711/141
  See application file for complete search history.

(56) References Cited

U.S. PATENT DOCUMENTS

| | | | | |
|---|---|---|---|---|
| 5,692,152 A | * | 11/1997 | Cohen | G06F 12/0848 711/122 |
| 2004/0123034 A1 | * | 6/2004 | Rogers | G06F 12/0831 711/118 |
| 2007/0204106 A1 | * | 8/2007 | Donald | G06F 12/0862 711/118 |

* cited by examiner

*Primary Examiner* — Jae U Yu
(74) *Attorney, Agent, or Firm* — Nicholson de vos Webster & Elliott LLP

(57) ABSTRACT

Disclosed embodiments relate to a system with configurable cache sub-domains and cross-die memory coherency. In one example, a system includes R racks, each rack housing N nodes, each node incorporating D dies, each die containing C cores and a die shadow tag, each core including P pipelines and a core shadow tag, each pipelines associated with a data cache and data cache tags and being either non-coherent or coherent and one of X coherency domains, wherein each pipeline, when needing to read a cache line, issues a read request to its associated data cache, then, if need be, issues a read request to its associated core-level cache, then, if need be, issues a read request to its associated die-level cache, then, if need be, issues a no-cache remote read request to a target die being mapped to hold the cache line.

20 Claims, 25 Drawing Sheets

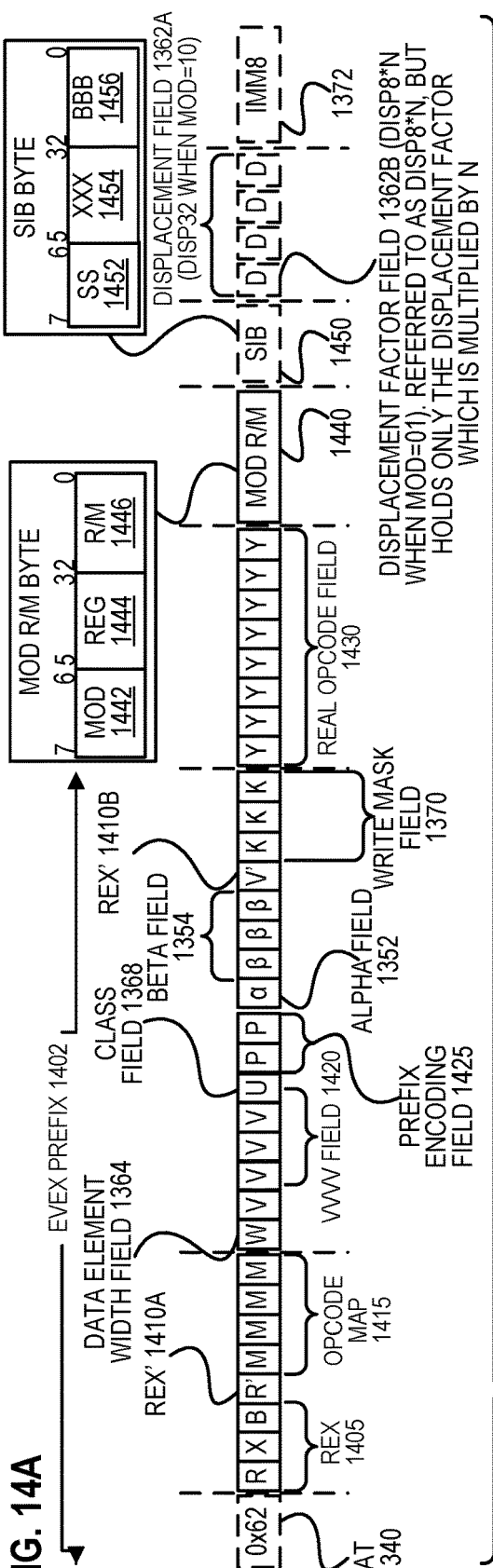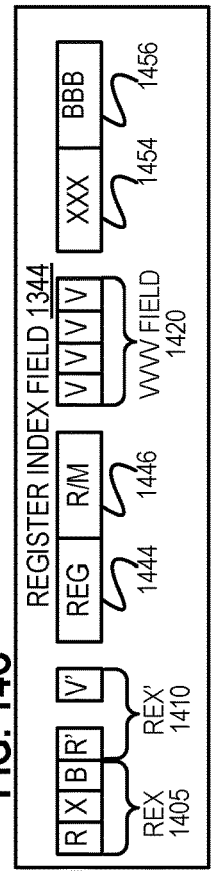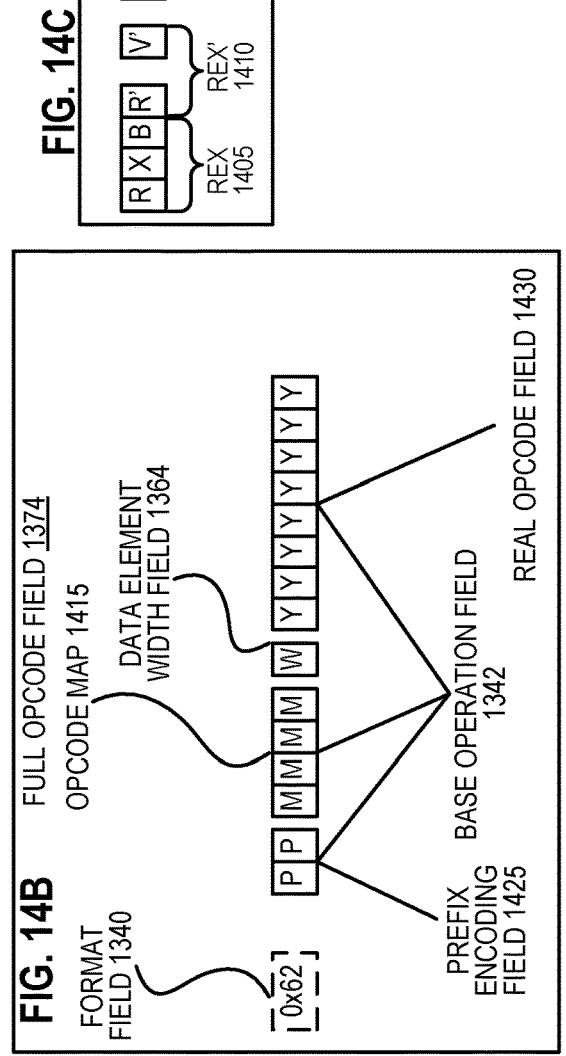

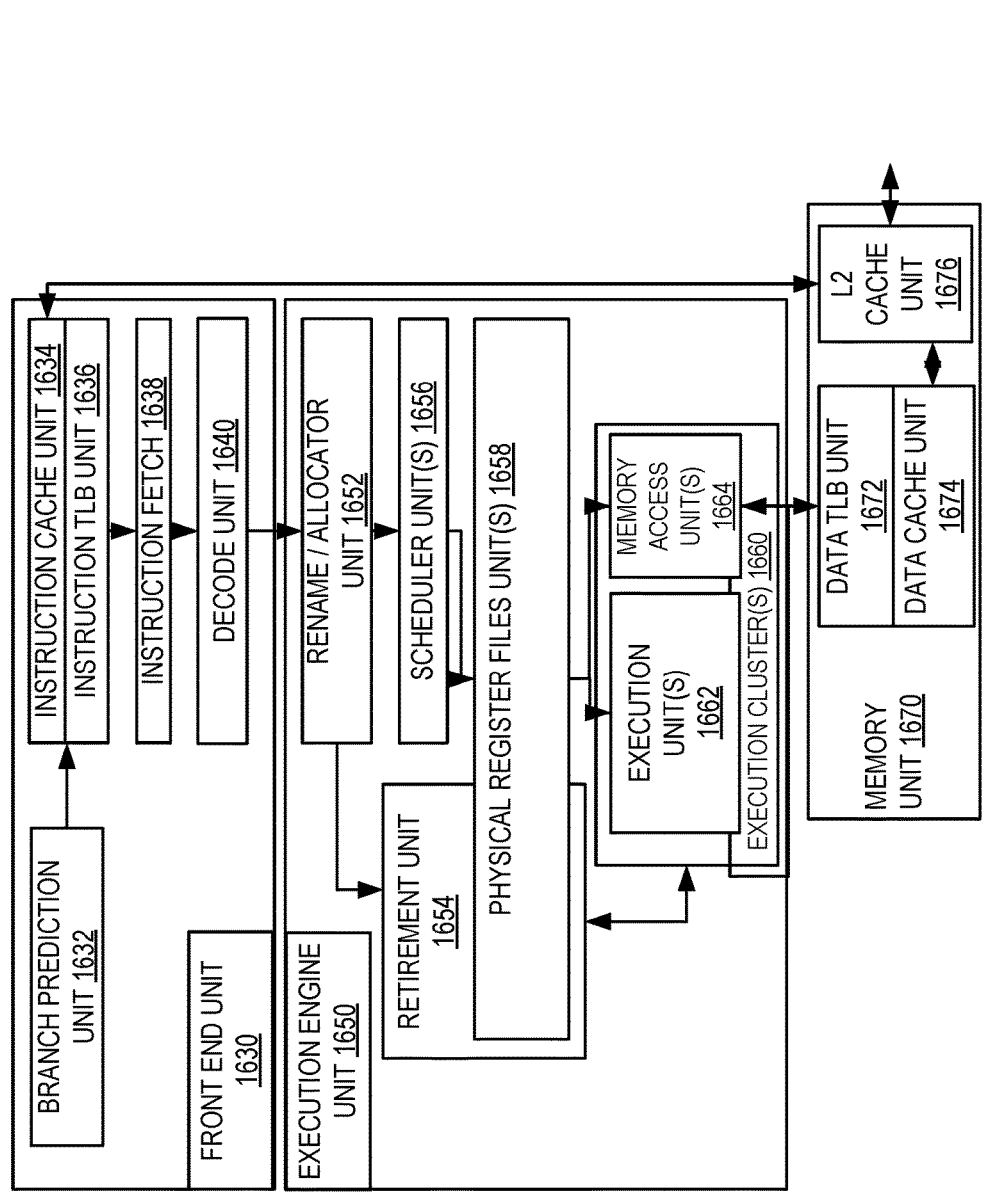
FIG. 16A
FIG. 16B

MULTI-PROCESSOR SYSTEM WITH CONFIGURABLE CACHE SUB-DOMAINS AND CROSS-DIE MEMORY COHERENCY

STATEMENT OF GOVERNMENT INTEREST

This invention was made with government support under contract number HR0011-17-3-0004, awarded by DARPA. The government has certain rights in this invention.

FIELD OF THE INVENTION

The field of invention relates generally to computer processor architecture, and, more specifically, to a multiprocessor system with configurable cache sub-domains and cross-die memory coherency.

BACKGROUND

With the advancement of simultaneous multi-threaded (SMT) processors comes the potential for improved processing performance, especially in the context of vectorization and parallel processing in the context, for example, of multi-core systems and graph analytics workloads.

At the same time, having multiple threads operating concurrently and all accessing memory presents challenges with respect to the memory system architecture.

For example, direct memory operations to move data from one memory location to another incur significant latencies, especially when each datum being moved is first returned to the requesting core pipeline.

Further, for example, each multi-threaded processor (MTP) sometimes executes multiple, say 16, threads concurrently, often sharing data with multiple other pipelines in a same core, multiple cores in a same die, multiple dies in a same rack, and multiple racks in a computing system. This creates unique challenges, including, for example, handling cache coherency across the threads in the computing system. Also, because of their tendency to access large amounts of random 8-byte accesses in sparse matrices, many graph workloads are not cache friendly.

BRIEF DESCRIPTION OF THE DRAWINGS

The present invention is illustrated by way of example and not limitation in the figures of the accompanying drawings, in which like references indicate similar elements and in which:

FIG. 8A is a portion of an address map targeting a specific die's in-package memory (IPM) or scratchpad, according to some embodiments;

FIG. 8B is an address targeting a no-cache remote engine, according to some embodiments;

FIG. 13A is a block diagram illustrating a generic vector friendly instruction format and class A instruction templates thereof according to some embodiments of the invention;

FIG. 13B is a block diagram illustrating the generic vector friendly instruction format and class B instruction templates thereof according to some embodiments of the invention;

FIG. 14A is a block diagram illustrating an exemplary specific vector friendly instruction format according to some embodiments of the invention;

FIG. 14B is a block diagram illustrating the fields of the specific vector friendly instruction format that make up the full opcode field according to one embodiment;

FIG. 14C is a block diagram illustrating the fields of the specific vector friendly instruction format that make up the register index field according to one embodiment;

FIG. 16A is a block diagram illustrating both an exemplary in-order pipeline and an exemplary register renaming, out-of-order issue/execution pipeline according to some embodiments;

FIG. 16B is a block diagram illustrating both an exemplary embodiment of an in-order architecture core and an exemplary register renaming, out-of-order issue/execution architecture core to be included in a processor according to some embodiments;

FIG. 17A is a block diagram of a single processor core, along with its connection to the on-die interconnect network and with its local subset of the Level 2 (L2) cache, according to some embodiments;

FIG. 17B is an expanded view of part of the processor core in FIG. 17A according to some embodiments;

FIG. 19 shown a block diagram of a system in accordance with some embodiments;

FIG. 20 is a block diagram of a first more specific exemplary system in accordance with some embodiment;

FIG. 21 is a block diagram of a second more specific exemplary system in accordance with some embodiments;

FIG. 22 is a block diagram of a System-on-a-Chip (SoC) in accordance with some embodiments.

DETAILED DESCRIPTION OF THE EMBODIMENTS

Figure 1:
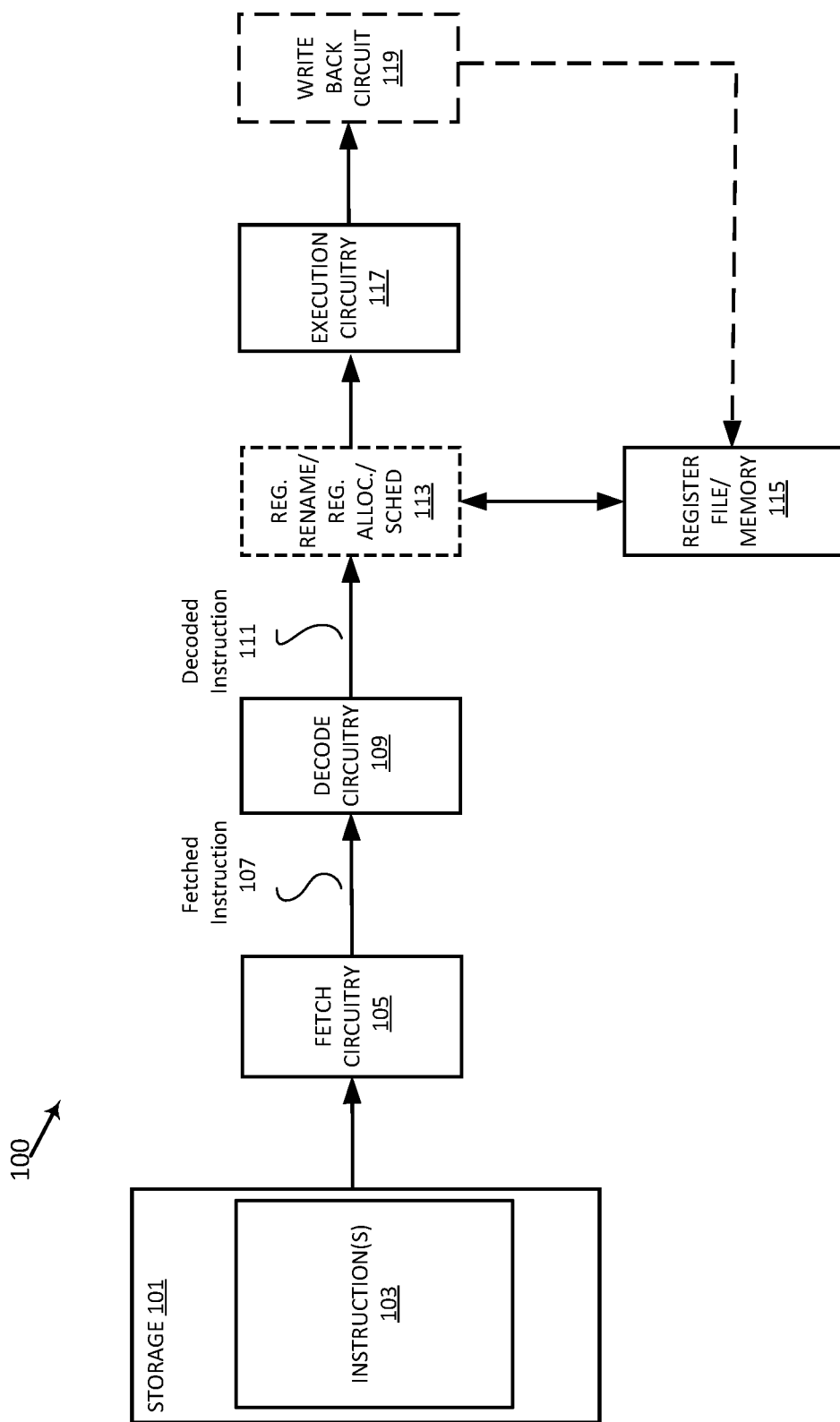
FIG. 1 is a block diagram illustrating processing components for executing instructions, according to some embodiments.

In the following description, numerous specific details are set forth. However, it is understood that some embodiments may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

Disclosed herein are embodiments of a multi-core, multi-threaded (MCMT) processing system that provides a fully configurable coherency approach that can include sub-domain cache groupings of any combination in a single multi-core, multi-threaded (MCMT) processor die (each die has 48 pipelines). Via software configuration of domain ID MSRs (Model-Specific Registers or Machine-Specific Registers), the programmer can tailor the coherency organization to their programming model. Additionally, the disclosed MCMT processor implements a core-local/die-global MOESI-F protocol to reduce the performance impact of die-level cache coherency management.

Because of their poor cache-line utilization and low temporal locality, graph applications do not execute well on fully coherent cache-based architectures. The disclosed MCMT processing system's selective caching approach is appropriate for these types of problems. At the same time, a fully coherent multi-core, multi-threaded system requiring software management and control of data in distributed scratchpads and dynamic random access memory (DRAM) may not be feasible for many legacy programming approaches. Disclosed MCMT processors reduce this gap by allowing a variable level of cache coherency depending on the programmer's needs.

Multi-Core, Multi-Threaded Cache Organization

The disclosed multi-core, multi-threaded (MCMT) processing system is a distributed globally addressable system (DGAS) with a single data cache local to each pipeline. In a single MCMT die, there are eight MCMT processor cores with six pipelines per core—four 16-thread multi-threaded pipelines (MTP), and two single-threaded pipelines (STP)—supporting a total of 66 hardware threads in a single core.

Because of their tendency for large amounts of random 8-byte accesses into sparse matrices, many graph workloads are not cache friendly. Therefore, the disclosed MCMT system's approach to selective caching (i.e., providing cached accesses for loads/stores that set a bit in the address map) works well for programmers that wish to cache only smaller, heavily used data structures while utilizing disclosed processors' remote atomics and loads/stores direct to DRAM/scratchpad. This requires a specific programming model, however, and it is important for the architecture to provide sufficient support for a variety of programming models. Providing this larger breadth of support requires a level of software configurability to create a cache organization and coherency model consisting of configured sub-domains that will allow the programming method to seamlessly operate on the disclosed MCMT processors.

At the core level, grouping a subset of pipes into a coherent sub-domain could improve performance. One example would be to have a set of MTPs, being in the same coherent sub-domain, collaborating on executing a set of data-parallel tasks. Such tasks would typically access the data through a data-structure using an index, which may benefit from caching. When a pipe cannot find any more tasks to execute in that set of tasks, a scheduler may assign it to a new set. One concern is that executing the other tasks—potentially operating on different (unrelated) data-structures—will negatively affect the performance of the cache. To address this, the pipe that has no work could be assigned to a new coherent sub-domain.

At the die-level, the ability to group cores into coherent sub-domains allows for more design flexibility to support and deploy legacy codes operating on the disclosed multi-core, multi-threaded system. For instance, when using the MPI+X programming model, one MPI process can be mapped to each coherent sub-domain, while the X library (pthread, OpenMP, TBB, etc.) can leverage the coherent compute resources therein.

Another use-case for both die and core-level sub-domains is when workloads are organized using producer/consumer or pipelined workflow patterns. The code of the workload has distinct execution paths executing concurrently, which may bring different codes and data into the cache, negatively impacting performance. Coherent sub-domains allow for isolation of such code executions and limit their side effects while allowing the flexibility of provisioning different amounts of compute resources for each.

Figure 12:
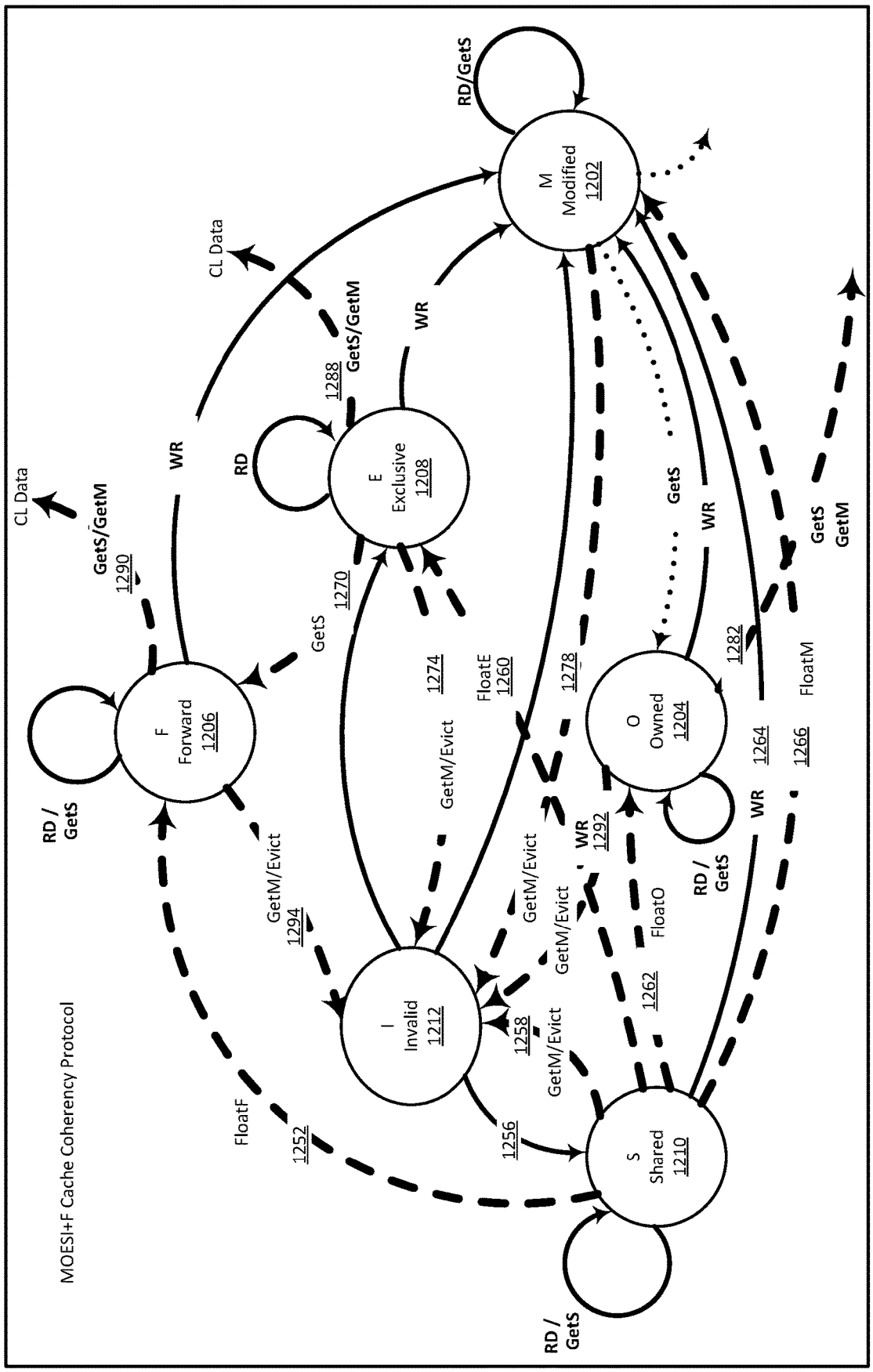
FIG. 12 illustrates a state flow diagram for the MOESI-F (Modified Owned Exclusive Shared Invalid Forward) cache coherency protocol, according to some embodiments.

The cache coherency in some embodiments uses the MOESI-F (Modified Owned Exclusive Shared Invalid Forward) Coherency Protocol shown in FIG. 12, which is a block diagram illustrating MOESI-F coherency protocol state transitions, according to some embodiments.

Challenges

Providing this level of flexibility in the cache coherency approach places requirements on the hardware to limit performance overheads, specifically:

1. A coherency management method that can scale with the different sub-domain sizes and number of sub-domains. For example, a directory method managed at the DRAM or scratchpad (while already not optimal in the multi-die, multi-domain system) would not adjust its method of coherency management and not provide any performance benefit of multiple-coherent domains, and 2. Supporting coherency between the disclosed multi-core, multi-threaded (MCMT) processing cores (at the die level) will impact performance. Utilizing the hierarchical approach to mitigate this issue is important.

The disclosed multi-core, multi-threaded processing system supports coherency tracking at two levels of the architecture. A single MCMT processing core has six pipelines: four multi-threaded (16 threads each) and two single-threaded. Each pipeline has its own data cache with a direct connection to a core shadow tag, which is responsible for coherency management between all pipeline data caches in the disclosed MCMT processing core. The core shadow tag has one port to each cache and one port to the die-level shadow tag. Internally, the core shadow tag tracks the current state of each line in every cache in the coherency domain. Caches may not transition states (i.e. from read to write) without first making a request to the core shadow tag.

FIG. 1 is a block diagram illustrating processing components for executing instructions, according to some embodiments. As shown, computing system 100 includes storage 101 to store instruction(s) 103 to be executed.

In operation, the instruction(s) 103 is fetched from storage 101 by fetch circuitry 105. The fetched instruction 107 is decoded by decode circuitry 109, which decodes the fetched instruction 107 into one or more operations. In some embodiments, this decoding includes generating a plurality of micro-operations to be performed by execution circuitry (such as execution circuitry 117). Decode circuitry 109 also decodes opcode suffixes and prefixes (if used).

Execution circuitry 117, which has access to register file and memory 115, is to respond to decoded instruction 111 as specified by the opcode, and is further described and illustrated below, at least with respect to FIGS. 4, 6, 7, 8, 10, 11, 16A-B and 17A-B.

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded instruction 111 for execution on execution circuitry 117 out of an instruction pool (e.g., using a reservation station in some embodiments).

In some embodiments, writeback circuit 119 is to write back results of the executed instruction. Writeback circuit 119 and register rename/scheduling circuit 113 are optional, as indicated by their dashed borders, insofar as they may occur at different times, or not at all.

Figure 2:
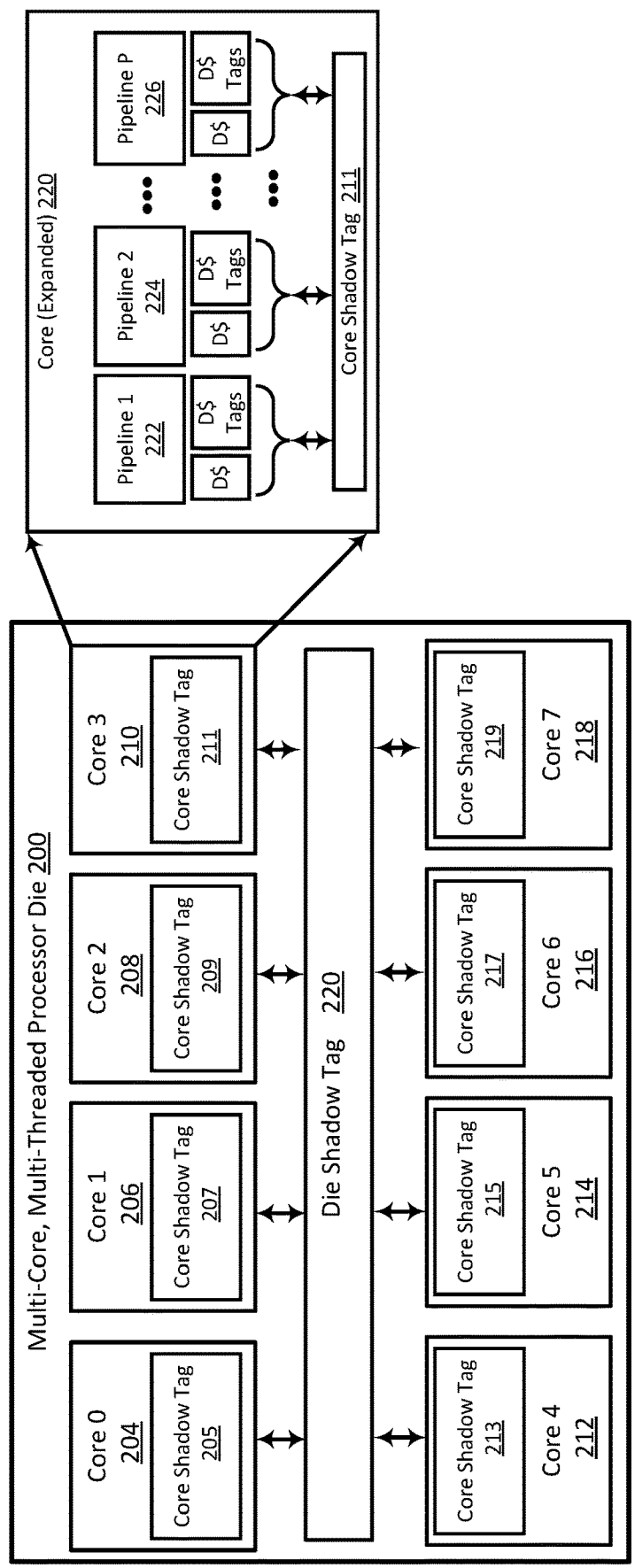
FIG. 2 illustrates hierarchical cache tags used to support die-level cache coherency in a multi-core, multi-thread processor, according to some embodiments.

FIG. 2 illustrates hierarchical cache tags used to support die-level cache coherency in a multi-core, multi-thread processor, according to some embodiments. FIG. 2 shows the organization of disclosed MCMT processing cores at the die level, according to an embodiment. Also shown are hierarchical cache tags used to support die-level cache coherency, according to some embodiments. In this embodiment, multi-core, multi-threaded (MCMT) processor die 200 includes eight cores, 204, 206, 208, 210, 212, 214, 216, and 218, which respectively include core shadow tags 205, 207, 209, 211, 213, 215, 217, and 219. All eight cores have a direct connection to a die shadow tag 220, which tracks the current state of (potentially) all cache lines in the eight cores at a per-core shadow tag granularity.

Also shown is an expanded view of one of the cores, 220, which includes P pipelines, 222, 224, to 226, each of which is coupled to a data cache and data cache tags. Core 220 includes core shadow tag 211, which tracks (potentially) all of the cache lines in the data caches associated with the pipelines.

Figure 3:
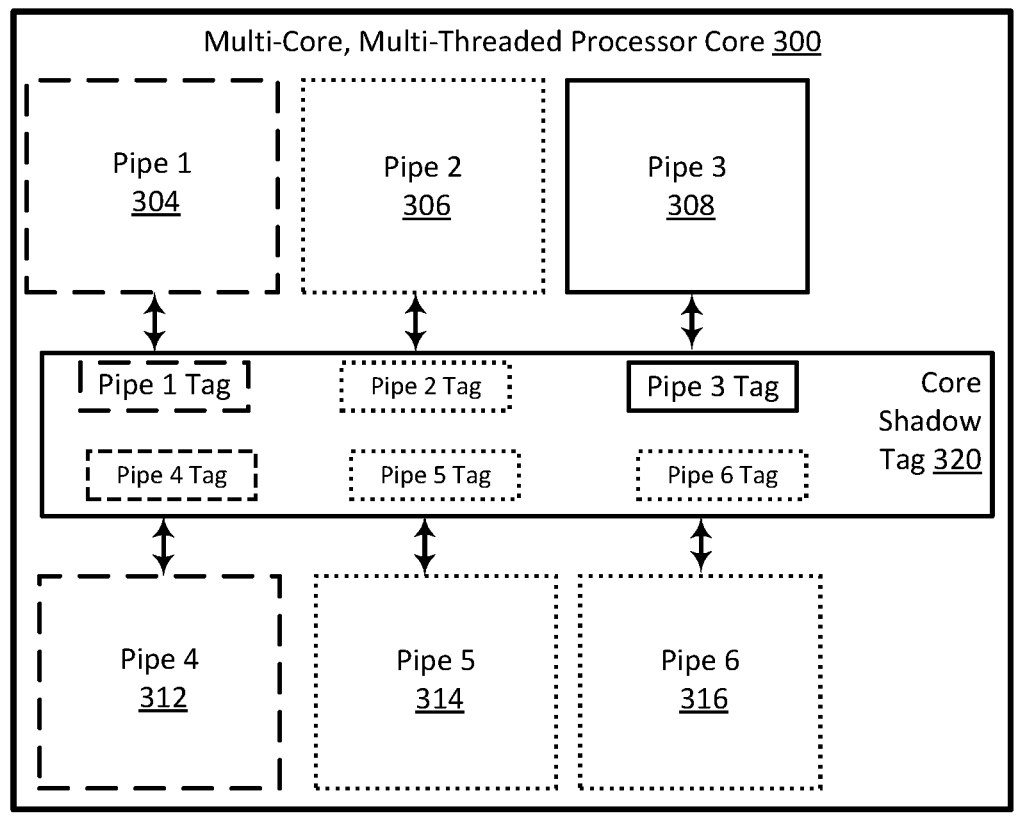
FIG. 3 illustrates cache coherency subdomains, according to some embodiments.
Figure 3:
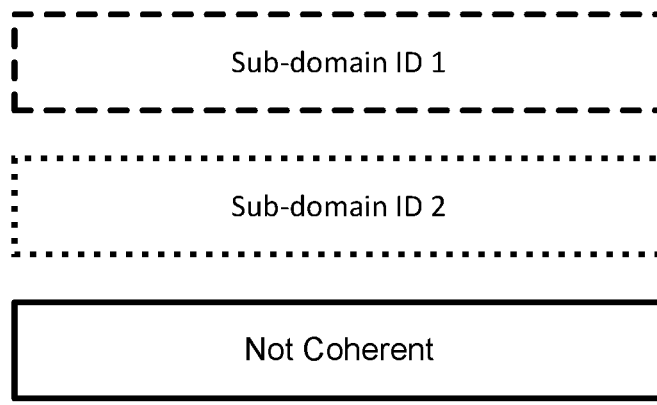

FIG. 3 illustrates cache coherency subdomains, according to some embodiments. Disclosed embodiments support and allow multiple (variably-sized) unique coherency domains within a single MCMT processor die, for example, as discussed below with respect to FIG. 3. Such coherency domains allow efficient coherency tracking and data sharing within small islands of a larger system.

It should be noted other embodiments of the disclosed MCMT die have different numbers of cores and pipelines. A more detailed explanation follows below. The full MCMT system may span multiple racks, where each rack consists of multiple nodes of 16-die sockets. Any address in the distributed global address system (DGAS) may be pulled into the coherent domain. The shadow tags provide a unit local to the caches that enables faster responses and promotes data sharing between caches within the core/die.

As further described below, disclosed embodiments support a two level (local/global) coherency monitoring system with the core shadow tag and die shadow tag. The two-level arrangement allows for a reduction of long latency messages out to the die shadow tag when a shared cache line already exists at a core level.

Configuring Coherency Sub-Domains in a Multi-Core, Multi-Threaded Core/Die

The disclosed multi-core, multi-system processor architecture supports the grouping of pipelines/cores into coherent sub-domains. These are configured via store operations to three machine-status registers (MSRs) that are visible in the MCMT processor address map. Table 1 lists the three MSRs, and their descriptions, width, and what level of the hierarchy they exist.

TABLE 1

| MSR | Description | Width (bits) | Level |
| --- | --- | --- | --- |
| CACHE_COHERENCY_EN | This cache is participating in coherency. | 1 | Per-pipe-line |
| CORE_COHERENCY_EN | This core shadow tag will send coherency messages to the die-shadow tag. | 1 | Per-core |
| DOMAIN_ID | If this cache is participating in coherency, this is the ID number of the sub-domain it is in. | 5 | Per-pipe-line |

The size of the DOMAIN_ID MSR is determined by the maximum number of unique sub-domains that can be supported within the die. A single MCMT processor die has 48 individual caches (six caches per MCMT processing core, eight cores per die) and a sub-domain requires at least two caches to participate. Therefore, a single die may have up to 24 unique sub-domains.

In some embodiments, the MSRs are configured one time during program initialization. However, dynamic reconfiguration of the sub-domains is allowed. Whenever any modifications are made to the MSR values, the cache will switch into a flush state, where it will clear all of its contents (alerting the core shadow tag), writing back any lines in a dirty state.

This concept at the MCMT processor core level is depicted in FIG. 3, which illustrates this concept of cache coherency subdomains at a core level, according to some embodiments. As shown, in this embodiment, multi-core, multi-threaded (MCMT) processor core 300 includes six pipelines (or "pipes"), 304, 306, 308, 312, 314, and 316. All six pipes have a direct connection to a core shadow tag 320, which tracks the current state of (potentially) all cache lines in the six pipeline data caches, at a per-pipe shadow tag granularity. Of the six caches managed by core shadow tag 320, two, 304 and 312, are participating in sub-domain 1. Three pipes, 306, 314, and 316, are participating in sub-domain 2. A single cache, associated with pipe 308, has coherency disabled—making it private and meaning that it will send no requests to the core shadow tag.

The core shadow tag has its internal arrays organized such that there is a 1:1 mapping to each cache in the core and these arrays are accessed based on the DOMAIN_ID MSR of that cache. When a request is received by the shadow tag, it will come with the domain ID of the cache that sent it. The shadow tag will then only reference arrays that share the same ID. Accessing fewer than all of the arrays will lower read energy and total response time, assuming that the number of caches in that domain is less than the maximum. Additionally, requests coming to the shadow tag from caches in different sub-domains may be serviced in parallel. At the trade-off of increased complexity, the single core shadow tag has the capability of serving as up to three unique sub-domain shadow tags (up to three tags correspond to the up to six pipes).

The die shadow tag 220 will operate in the same way as the core shadow tags 320. The internal arrays also map at a 1:1 ratio to each cache in the die, meaning that they can be marked with the current DOMAIN_ID MSR value that was set for each cache. Requests received from core shadow tags 320 will come with the sub-domain ID, allowing the die shadow tag 220 to reduce energy consumption when possible.

While the die shadow tag 220 has the maximum storage capability, it will only be used if every single cache in the die domain is holding its own unique line (i.e., no sharing). Otherwise, if a core has multiple caches sharing the line, it will occupy multiple core shadow tag entries 320 but only a single die shadow tag entry 220 (representing the entire core). This concept will be explained further below.

MOESI-F Protocol

Figure 15:
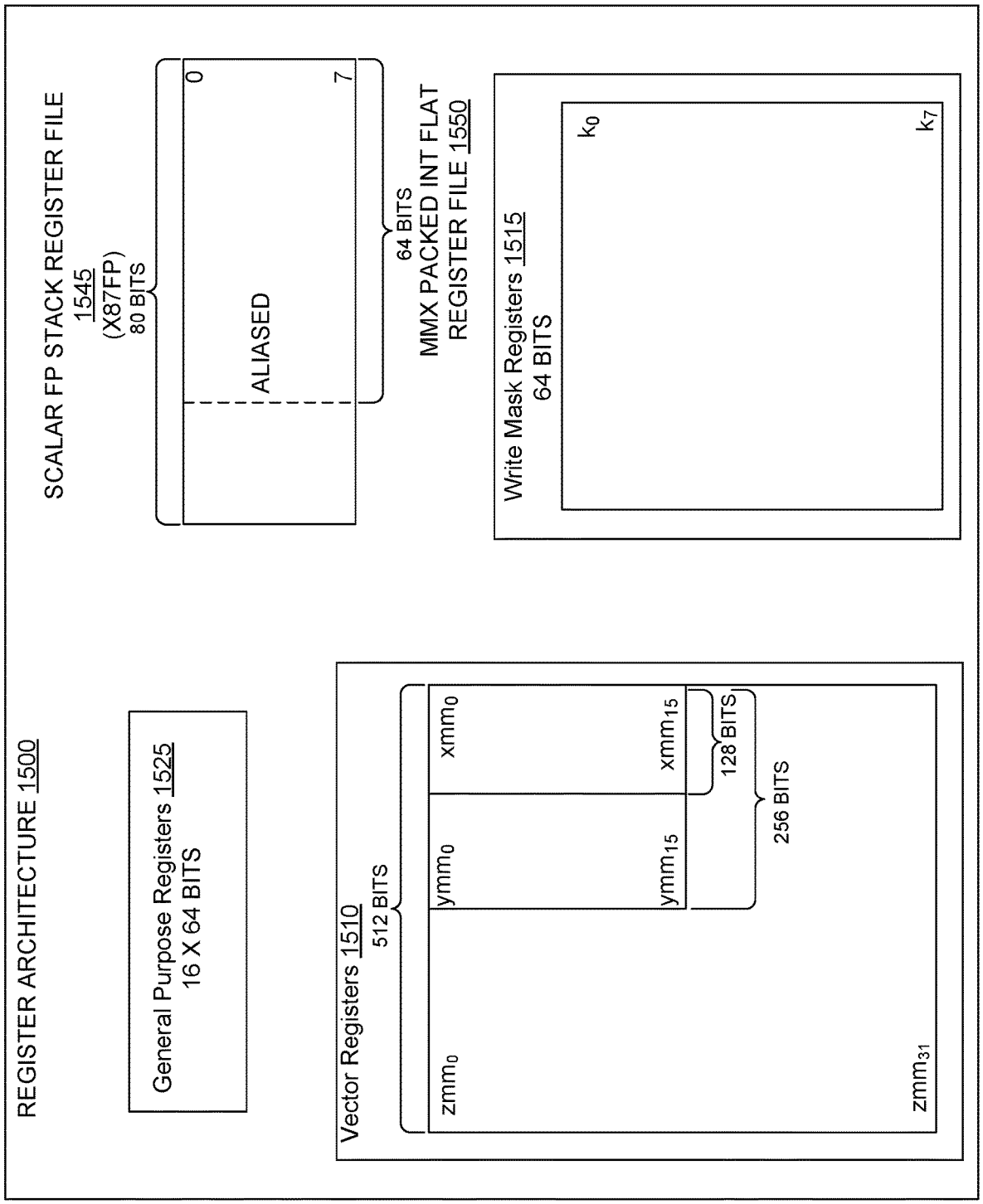
FIG. 15 is a block diagram of a register architecture according to one embodiment.

In some embodiments, the core shadow tag and the die shadow tag both use a MOESI-F cache coherency protocol, which is further illustrated and described with respect to FIG. 15. The MOESI-F states are also defined below in Table 2.

TABLE 2

| State | DESCRIPTION |
| --- | --- |
| (M)odified | Dirty cache line; Write-access; No other caches share. |
| (O)wned | Dirty cache line; Read-only; Other caches share; This cache forwards data. |
| (E)xclusive | Clean cache line; Read-only; No other caches share. |
| (S)hared | Clean cache line; Read-only; Other caches share. |
| (I)nvalid | Cache does not hold the line. |
| (F)orward | Clean cache line; Read-only; Other caches share; This cache forwards data. |

For a cache that is participating in both core level and die level coherency, each RD or WR request would require a request sent to the core shadow tag and sub-sequentially to the die shadow tag so that the state change for that cache's line can be tracked in both units. Many situations exist, however, where a message to the die shadow tag is unnecessary. To prevent these and improve performance, the MCMT processor architecture implements local and global state tracking.

The global state, as that term is used herein, is that which is visible to the die shadow tag. The die shadow tag manages cache lines according to each MCMT processor core's global state and in full accordance with the previously described MOESI-F protocol. Each MCMT processor core (for a single domain ID) will have a single global state and cache-line tag entry in the die shadow tag, even if multiple caches within that core share the cache line.

The core shadow tag will track both the global and local states for each cache's line in the shadow tag. Caches (within a core) that share a line may have different local states, but will always have the same global state. Table 3 shows the legal combinations of local and global states.

TABLE 3

| Global | Local | Notes |
| --- | --- | --- |
| M | M/O/S | Core is the only one with the dirty line (globally). Local O/S valid to share line within core. For cache to write, must be in global M and local M. |
| O | O/S | Die shadow tag may request for local O cache to send data remote. |
| E | E/F/S | Core is the only one with the clean line (global). Local F/S valid to share line within core. |
| S | S | Can still share within core. Explained below. |
| I | I | |
| F | F/S | Die shadow tag may request for local F cache to send data remote. |

With the hierarchical approach of the local/global coherency, the handling of cache sharing and coherent state transitions will change at the local level. This is most easily described starting with the explanation of specific local/global rules:

Local State May Only be M if Global State is M.

The MOESI-F coherency protocol dictates that only a single cache in the entire coherent domain may have write-ability. Allowing a local M without a global M would violate this requirement.

Local State May Only be E if Global State is E.

The protocol allows for a fast upgrade from E state to M state. This requires that only one E cache exists in the domain.

If Global State is S, Local State May Only be S.

Allowing a local cache to be in the O or F state when the global state is S would potentially (inadvertently) promote that cache to M or E (via other local caches evicting). This may create more than one M or E cache in the die domain and violate the protocol.

Supporting the final restriction requires a modification to the MOESI-F protocol. The protocol is designed such that a cache will always be in a designated forwarding state (F, O, E, or M). Allowing all local caches to be in S state creates a situation where no local cache is a designated forwarder. However, when a new local cache makes a request for the line, it is most optimal for performance to have a cache in the local MCMT processor core respond. Therefore, the following change is proposed: when the global state is S and there are only local caches in S, the core shadow tag needs to determine: A) who will forward data to a new local cache asking for that cache line in "RD"; and B) who will assume F, O, M, or E state if the die shadow tag sends a "Float*" request and the core domain changes its global state to F/O/E/M. To determine this, the core shadow tag will select the S cache that is the lowest ordered pipeline in the core (i.e. pipeline 0, 1, 2 . . . 5).

Figure 4:
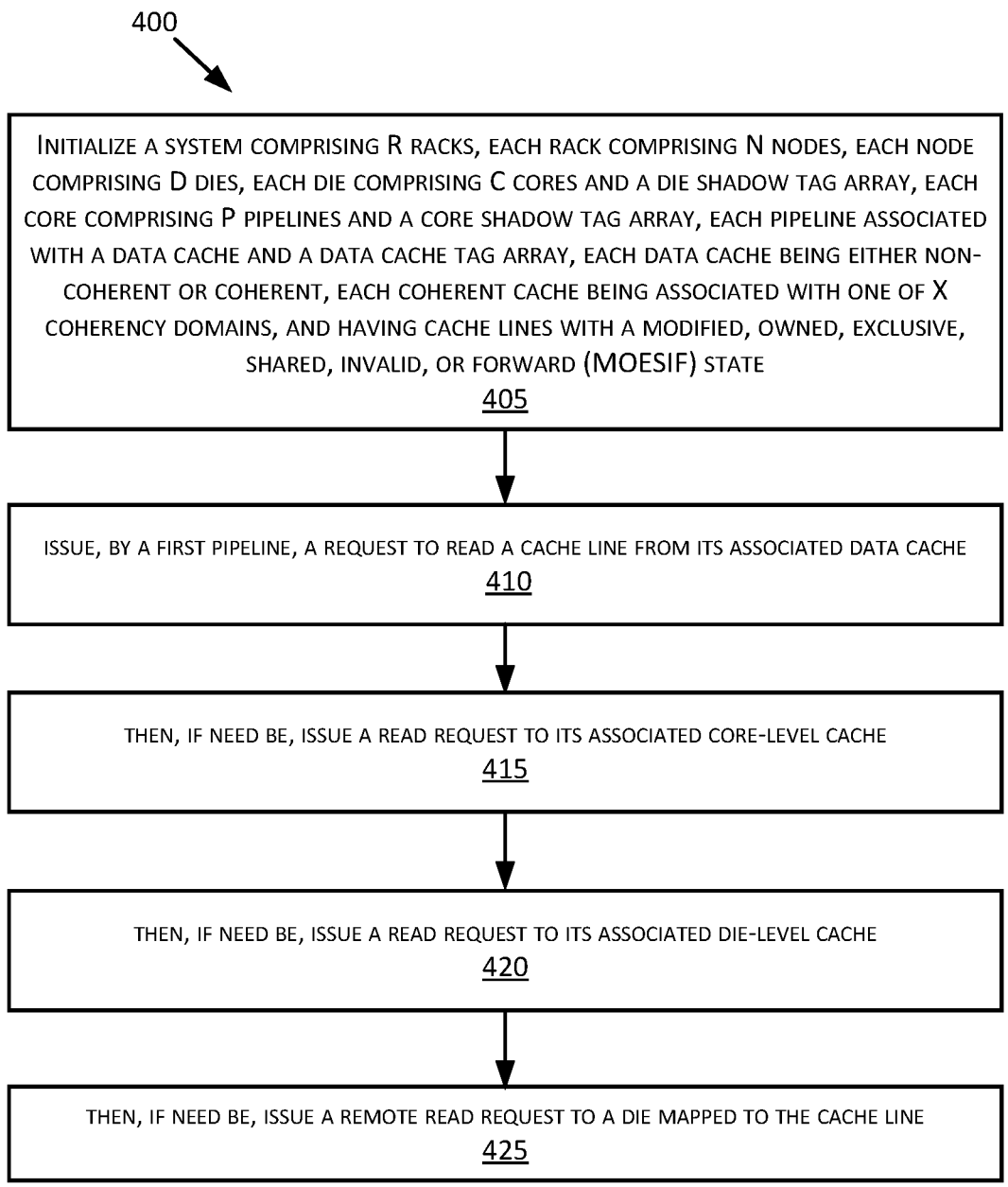
FIG. 4 is a flow diagram illustrating steps taken by a multi-core, multi-thread (MCMT) processor to transition among coherency states, according to some embodiments.

FIG. 4 is a flow diagram illustrating steps taken by a first pipeline of a multi-core, multi-thread (MCMT) processor to read a cache line. As shown, a flow of operations 400 is to be conducted by a first pipeline. At 405, the first pipeline is to initialize the system having R racks, each rack having N nodes, each node having D dies, each die having C cores and a die shadow tag array, each core having P pipelines and a core shadow tag array, each pipeline associated with a data cache and a data cache tag array, each data cache being either non-coherent or coherent, each coherent cache being associated with one of X coherency domains, and having cache lines with a modified, owned, exclusive, shared, invalid, or forward (MOESI-F) state At 410, the first pipeline is to issue a request to read a cache line from its associated data cache.

Then, at 415, the first pipeline is to, if need be, issue a read request to its associated core-level cache.

Then, at 420, the first pipeline is to, if need be, issue a read request to its associated die.

Then, at 425, the first pipeline is to, if need be, issue a remote read request to a die mapped to the cache line.

Cache Coherency Procedures

The below-described flow diagrams depict the coherency process across the data cache, core shadow tag, and die shadow tag.

Cache Coherency Process in Response to a Read Request

Figure 5:
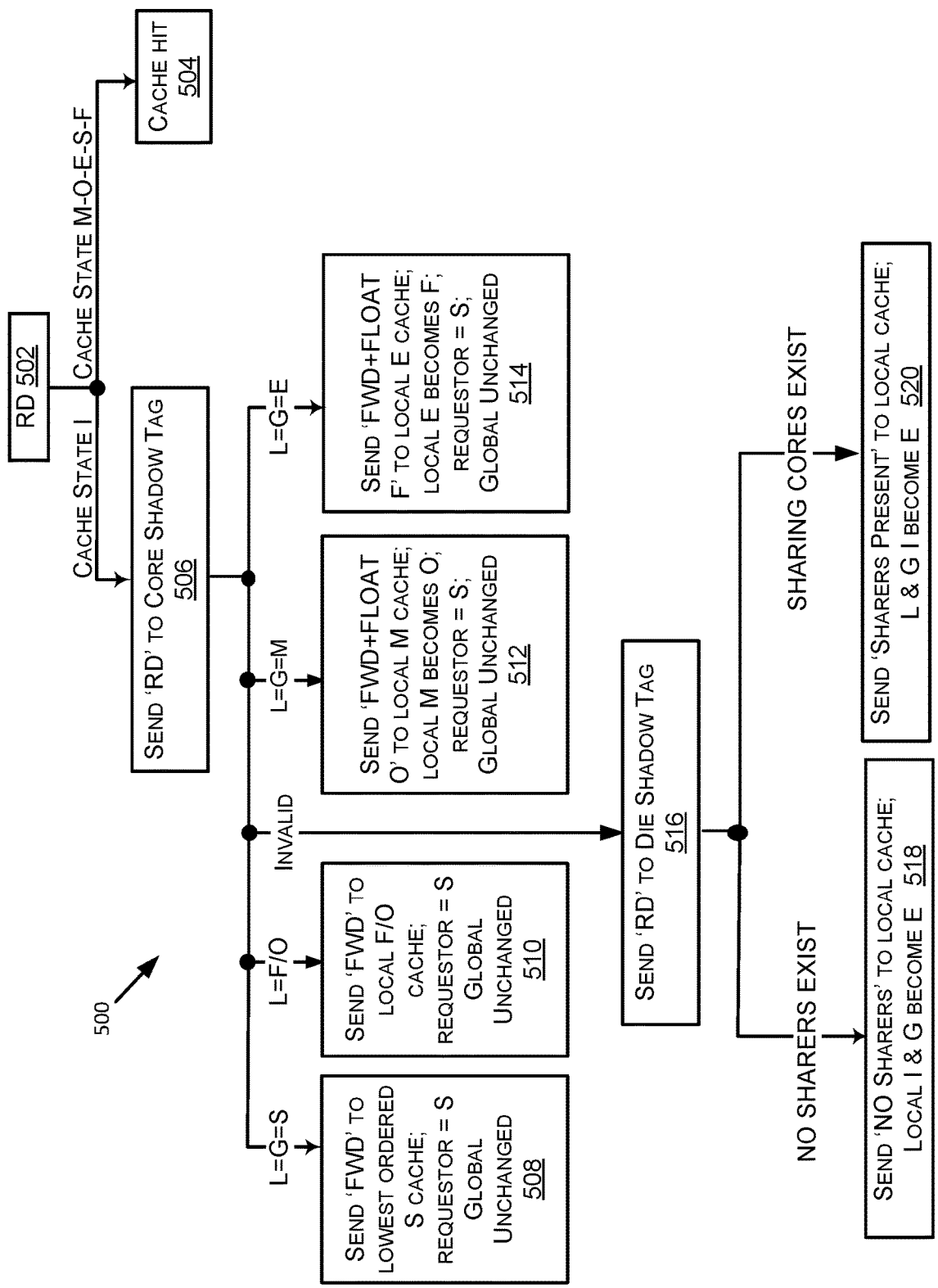
FIG. 5 is a block flow diagram illustrating a coherency flow beginning with a read request to a data cache, according to some embodiments.

FIG. 5 is a block flow diagram illustrating a coherence flow beginning with a read request to a data cache, according to some embodiments. As shown, flow 500 begins with a pipeline issuing a read (RD) request to a data cache at 502. The flow then transitions to one or more of operations 504, 506, 508, 510, 512, 514, 516, 518, and 520. Each of the transitions is controlled by the conditions listed on the arc showing the transition. The transition conditions sometimes include "L" or "G," which as used herein refer to local or global state. For example, flow 500 transitions from operation 502 to operation 504 if the cache state is any one of M, O, E, S, or F.

As can be seen, in most cases, a RD request to the data cache can be handled by only the core shadow tag. The only case where a message must be sent to the die shadow tag is when the global state is I. If this occurs, a RD request is sent to the die shadow tag, and the cache line is brought in locally as either global E or S.

Figure 6:
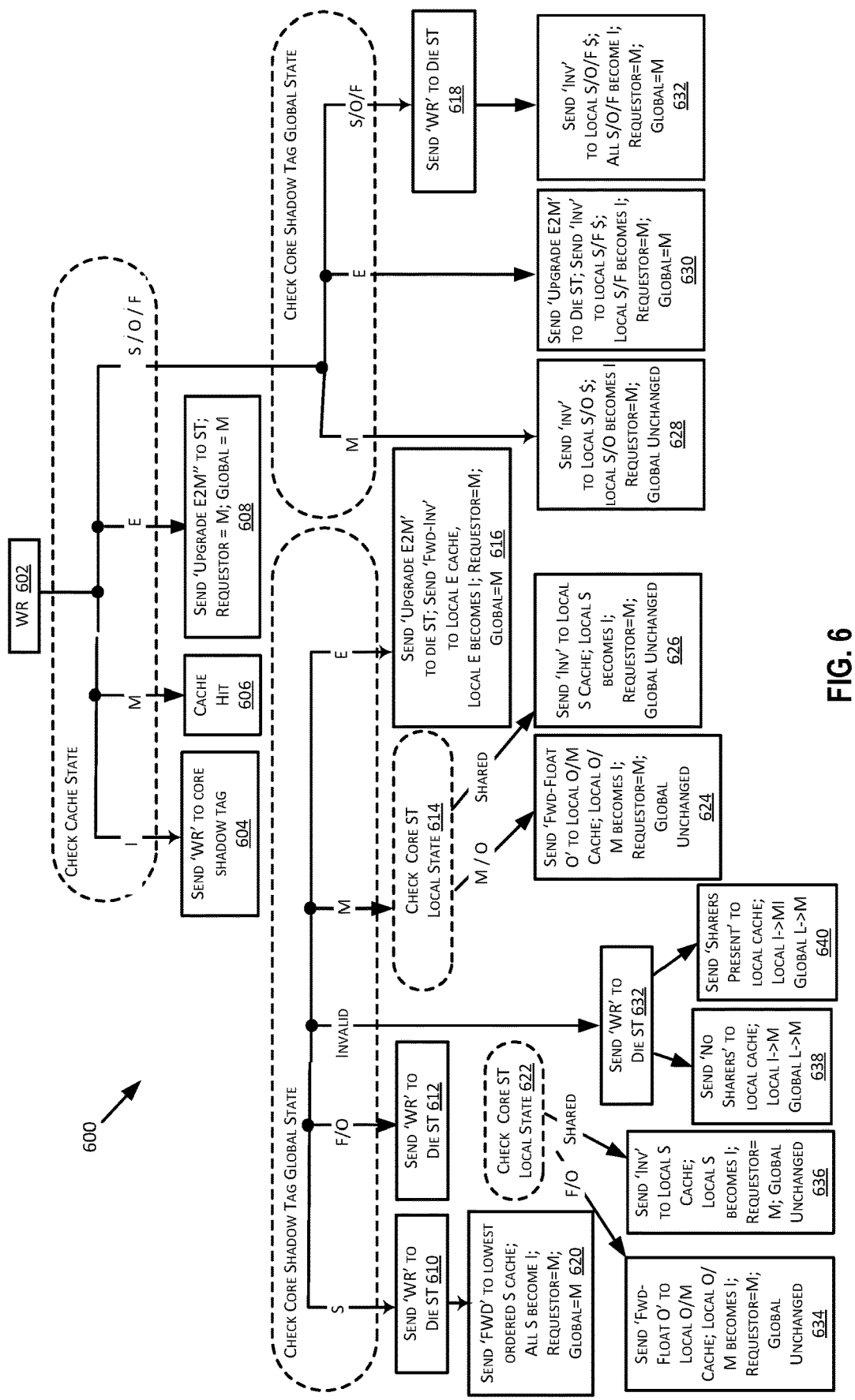
FIG. 6 is a block flow diagram illustrating a coherency flow beginning with a write request to a data cache, according to some embodiments.

FIG. 6 is a block flow diagram illustrating a coherence flow beginning with a write (WR) request to a data cache, according to some embodiments. As shown, flow 600 begins with a pipeline issuing a WR request to a data cache at 602. The flow then transitions to one or more of operations 604, 606, 608, 610, 612, 614, 616, 618, 620, 622, 624, 626, 628, 630, 632, 634, 636, 638, and 640. Each of the transitions is controlled by the conditions listed on the arc showing the transition. The transition conditions sometimes include "L" or "G," which as used herein refer to local or global state. For example, flow 600 transitions from operation 602 to operation 604 if the cache state is any one of M, O, E, S, or F.

As can be seen, a majority of cases here result in a WR request being sent to the die shadow tag to give the core shadow tag global M state. Only when the core shadow tag already has the line in global M state will it not need to communicate with the die shadow tag (i.e., any case where global is unchanged). In this situation, the core shadow tag can manage the data forwarding and cache invalidations locally.

Figure 7:
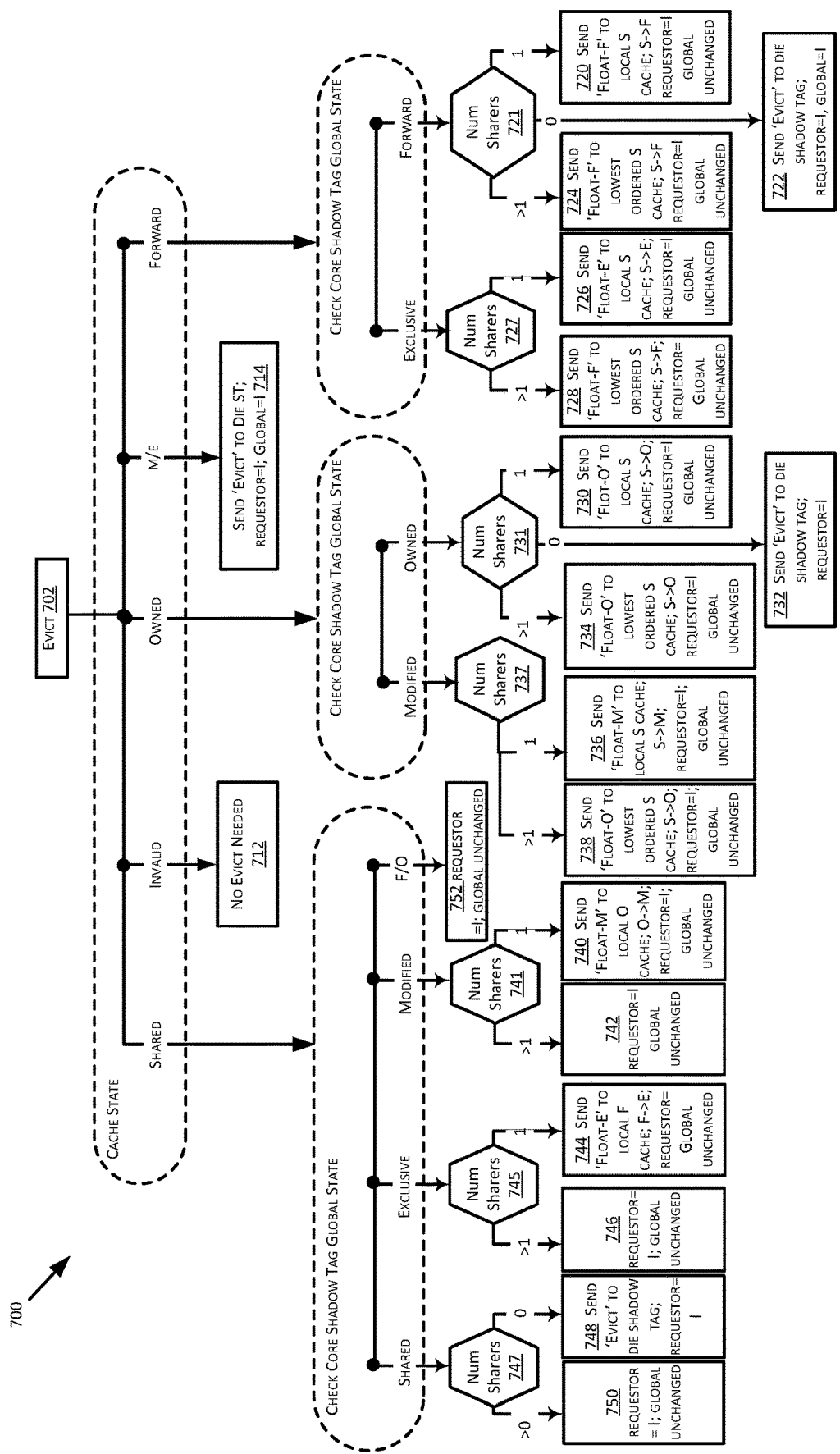
FIG. 7 is a block flow diagram illustrating a coherency flow beginning with an evict request to a data cache, according to some embodiments.

FIG. 7 is a block flow diagram illustrating a coherency flow beginning with an evict request to a data cache, according to some embodiments. As shown, flow 700 begins with a pipeline issuing an EVICT request to a data cache at 702. The flow then transitions to one or more of operations 704, 706, 708, 710, 712, 714, 716, 718, 720, 721, 722, 724, 726, 727, 728, 730, 731, 732, 734, 736, 737, 738, 740, 741, 742, 744, 745, 746, 747, 748, and 750. As with FIGS. 5 and 6, above, each of the transitions is controlled by the conditions listed on the arc showing the transition.

As can be seen, there are four specific cases where the die shadow tag must be alerted of the eviction:

1. The global (and local) state of the line is E or M, as shown at operation 714.
2. The global state of the line is S and the evicting cache is the last to hold the cache line, as shown at operation 748, which occurs after the number of sharers is found at operation 747 to be zero.
3. The global state of the line is F and the evicting local-F cache is the last to hold the cache line, as shown at operation 722, which occurs after the number of sharers is found at operation 721 to be zero.
4. The global state of the line is O and the evicting local-O cache is the last to hold the cache line, as shown at operation 732, which occurs after number of sharers is found at operation 731 to be zero.

Multi-Core, Multi-Threaded Processing System Memory Organization

The base organization of the disclosed multi-core, multi-threaded (MCMT) processing system hierarchy is structured as follows: six pipelines per MCMT core, eight MCMT cores per die, and 16 dies per socket. Each of these levels of the hierarchy also come with their own grouping of "local" on-die scratchpad (SP) and in-package memory (IPM). Each MCMT core has 2 MB of scratchpad and a 2 GB IPM channel, totaling 16 MB-SP/16 GB-IPM at the die level and 256 MB-SP/256 GB-IPM in a single socket. All memory is visible in the 64-bit MCMT processor address map and can be accessed from any pipeline in the DGAS system.

The disclosed MCMT processor is designed as a system where selectively caching read-only (or private), heavily used data structures is the most optimal programming approach for solving cache-unfriendly graph applications. These workloads commonly consist of random, remote, small-granularity accesses and have little temporal or spatial locality. By setting bit-62 in the address, a memory location will be brought into the pipeline's local data cache. If that bit is not set, the load or store request is sent directly to the memory location, which may be local (within the core or die) or remote (on a different die/socket/board/rack). While programming with selective caching results in optimal performance, the disclosed MCMT processor must still support legacy codes. This means that programming models that expect all accesses to be cached (and therefore coherent between processes) must still be supported with minimal modification. The invention described in this disclosure and implemented in the disclosed MCMT processor aims to address this goal.

The highest boundary for cache coherency management in the MCMT system is at the die level. Each die has eight cores that have local coherency between their pipelines managed by a single core shadow tag unit. At the die level, all eight MCMT processing cores may remain cache coherent through tracking at the die shadow tag unit. The architecture provides the programmer the ability to construct the organization of the coherent domain (or multiple coherent sub-domains) in a manner that most optimally supports their programming model.

With no hardware support for inter-die cache coherency, software assumes responsibility for ensuring memory correctness by providing the latest coherent version of memory data when a request is made from a remote die. The high-level process will take the following steps. For the purposes of this example, the requesting cache will be referred to as cache-1. The remote cache who owns the data in their coherent domain will be referred to as cache-2.

1. Cache-2 flushes the cache line back to memory. This evicts it from the current coherent domain. Cache-2's pipeline must be made aware that the write-back has made it successfully to the memory location.
2. Upon receiving the store acknowledgement, cache-2's pipeline will notify cache-1's pipeline that the data is visible. This can be done via a remote atomic increment to the scratchpad local to cache-1, where cache-1's pipeline will be continuously checking the scratchpad location via atomic compare operations.
3. Once cache-1 becomes aware that the data is visible, it issues its load or store to the remote memory.
4. Upon return of the load data or store acknowledgement, cache-1 alerts cache-2 that the data is available again for modification via an atomic increment to cache-2's local scratchpad.

Challenges

Because the system is intended to be scalable to any level (i.e., multiple sockets/boards/racks), traditional hardware support for inter-die cache coherency may not be feasible. Coherency directory management at each memory endpoint needs a set system size to properly manage the protocol. Even if this were the case, the performance and areas overheads of this method in a system with thousands of dies would be significant.

The opposite approach—providing no hardware cache coherency support—allows for any level of hardware scalability and improves performance per coherency request by limiting it to within-die. However, software becomes fully responsible for inter-die memory management which eliminates the possibility of direct ports of legacy codes. Programs that properly manage memory correctness must sacrifice performance and efficiency to do so.

The disclosed multi-core, multi-threaded (MCMT) system provides a no-cache remote policy for inter-die memory accesses. With the no-cache remote policy enabled, the data cache will check for the memory address locality (i.e., is address in its die) before determining if the data will be brought into its coherent domain or accessed with a no-cache remote request. When a no-cache remote read or write request is sent to the remote die, the data that is read from or written to will be the most recent copy of coherent data within that die. This is done through the combined use of a no-cache remote engine and the disclosed MCMT die-level shadow tag, which manages die cache coherency traffic. The data will not be stored in the requesting cache, to ensure that it will always see the most recent coherent copy for each no-cache remote access.

Hardware implementations for inter-die cache coherency in a scalable MCMT system face many obstacles. Any protocol that requires constant (long latency) die-to-die communication faces severe performance issues. Directory tracking at each memory location incurs large storage overheads and would require support for the largest system orientation, which limits scalability. The opposite approach of providing no inter-die hardware coherency requires software to manage any shared data, which is A) not performance-optimal and B) not supported by most existing programming models.

The disclosed MCMT system's no-cache remote implementation provides a bridge between the two methods by giving the most recent coherent data on an inter-die memory access and ensuring memory correctness on writes. The policy has minimal area overheads and limits long-latency die-to-die messages to manage performance overheads.

The disclosed multi-core, multi-threaded (MCMT) processing system implements a no-cache remote memory policy. According to such policy, if the data cache receives a request to a scratchpad or IPM address that is located within its die, it will be brought in to the cache and managed by the MCMT core hardware cache coherency protocol. But, if the address is not local to the data cache's die, the data cache will send the load or store as a "no-cache remote" request to the remote die's die-level shadow tag. The shadow tag is then responsible for facilitating the return of the most recent (coherent) copy of data for a load, or correctly writing the data to memory (ensuring correctness) for a store request. This protocol accomplishes two main goals:

1. For workloads which require some data sharing between separate non-coherent MCMT processor dies, memory correctness is maintained for die-remote memory accesses. This eliminates the software memory management requirement.
2. Overhead and limitation of full cache coherency tracking across dies is reduced. Full system-scalability is supported by this method at the cost of lower performance for highly-accessed remote data—because remote data is never brought into the cache.

Activation:

Activating the no-cache remote policy is done through setting an enable machine-status register (MSR) bit that is accessible through the address map. If the enable bit is not set, the data cache will service all cache requests as regular cache-able addresses that are brought into the coherency domain. This will require software memory management for remote-die requests which may cross coherent domains.

Determining Memory Address Locality

Figures 8A, 8B:
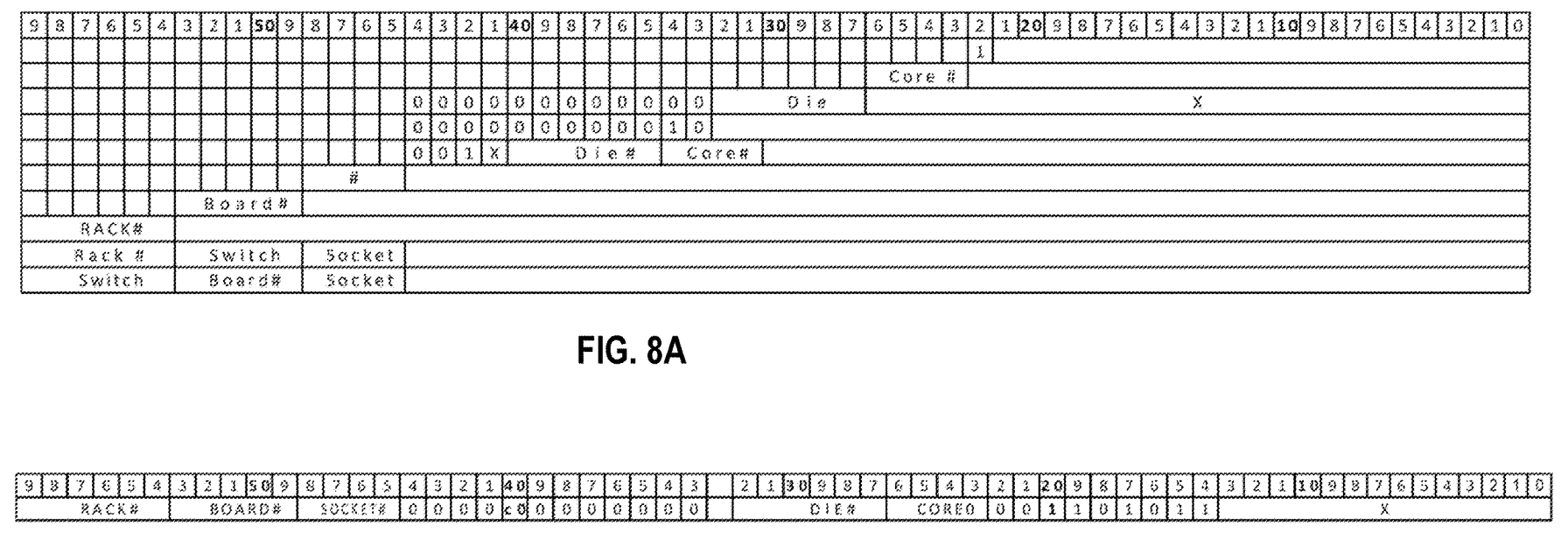

When executing the no-cache remote policy, the data cache will check for address locality by comparing the requested memory address with its DIE_LOCATION address MSR. This MSR is configured at system boot, unique to each of the disclosed MCMT processor die, and shared by all multi-threaded cores within a MCMT processor die. The comparison is performed based on the organization of the disclosed MCMT processor address map. A section of this address map is shown in FIG. 8A. The organization dictates that the observed location of the die ID changes depending on if the targeted memory is IPM or scratchpad according to the following two cases:

Case 1 (IPM): If bits [44:42]=3'b001, the requested address is to a die's IPM. For it to be the data cache's die, bits [59:45] and [40:35] of the requested address must match with bits [59:45] and [32:27] of the DIE_LOCATION MSR.

Case 2 (SP): If bits [44:42]=3'b000, the requested address is targeting SP. For it to be the data cache's die, bits [59:45] and [32:27] of the requested address and the DIE_LOCATION MSR must match.

Currently, no other bit combinations for bits [44:42] are supported. They stand as holes in the address map but are reserved for additional memory that may be added to the system.

FIG. 8A is a portion of an address map targeting a specific die's IPM or scratchpad, according to some embodiments.

Sending No-Cache Request to Remote Die: In the event that the data cache controller determines that the requested address is outside of its coherent domain, it will need to send a request with sufficient information to a unique location on the remote die. Each die has a single engine with its own port to the die level shadow tag. This engine—referred to as No-Cache Remote (NCR) Engine—is located in the address map in Core 0 of each die. The full address needed to target this location is shown in FIG. 8B. When any data cache makes a no-cache remote request to a die, it will send it to this address.

FIG. 8B is an address targeting a no-cache remote engine, according to some embodiments.

The request information included in the no-cache remote packet is shown in Table 4. This information is sent to the NCR engine and is necessary to fully execute the request and return the proper response. The total size of the request packet is 193 bits.

TABLE 4

| Field | DESCRIPTION |
| --- | --- |
| Destination Address | Address of memory location that cache wants to read from/write to. |
| Source Address | Address of data cache making request. |
| Request Type | Either no-cache remote load or store request. |
| Data | If is it a store request, 8-Byte data element to store. |

No-Cache Remote (NCR) Engine:

The NCR engine serves as the management unit for accessing the die shadow tag unit and executing the request. It has the following responsibilities:

Communicating directly with the die-shadow tag. The die-shadow tag coherency network is its own unique network within the disclosed MCMT processor with its own request/response format. The no-cache remote engine provides a bridge between the MCMT network (which can communicate die-to-die) to the die's private coherency network.

Managing multiple outstanding requests. A single no-cache remote engine may continuously receive requests back-to-back from caches in remote MCMT processor dies. The engine must manage the issuing and receipt of these requests efficiently, with outstanding queues sized sufficiently to prevent backpressure or re-tries over the network.

Properly executing requests according to the coherency protocol. The no-cache remote engine adds new request/response types to the die shadow tag for ensuring memory correctness on the remote load/store requests. These request/response types and the handling flows are shown later in the disclosure.

Figure 9:
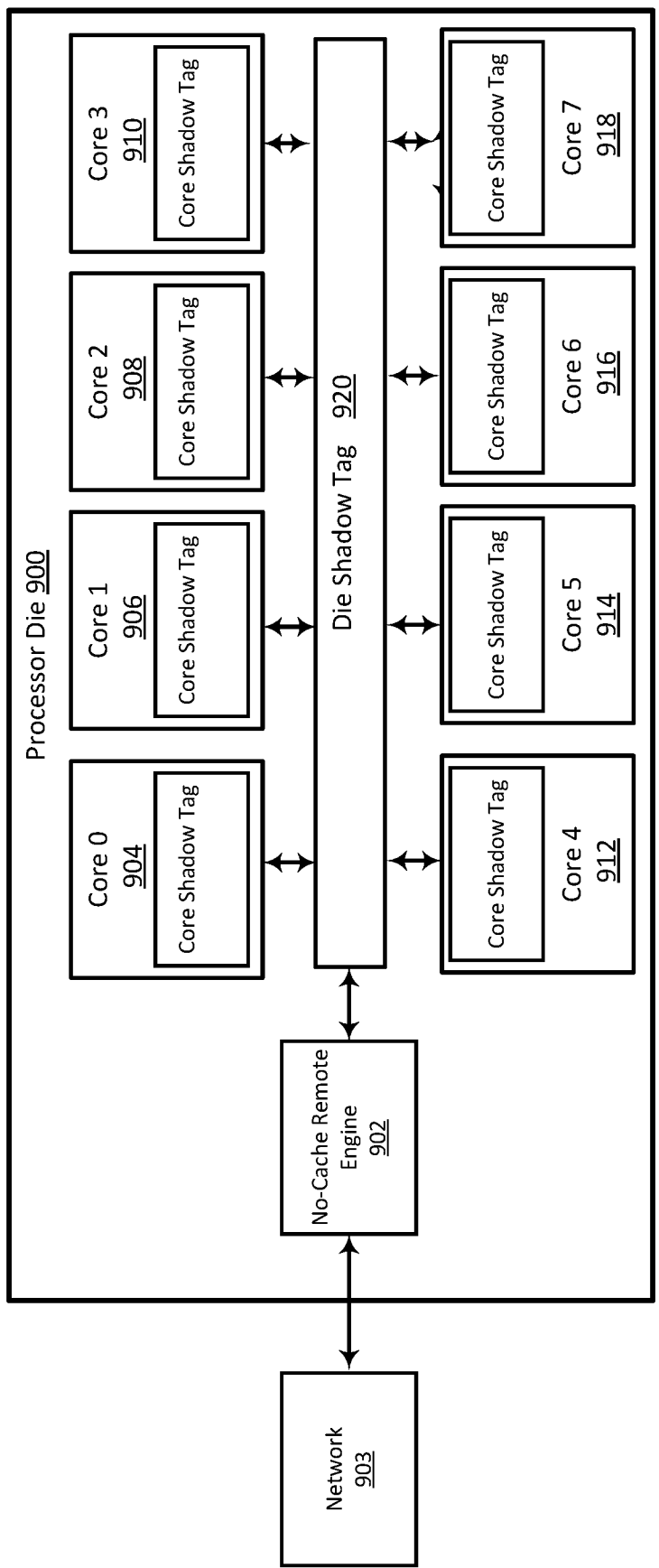
FIG. 9 is a block diagram illustrating inclusion of no-cache remote engine interface, according to some embodiments.

FIG. 9 is a block diagram illustrating inclusion of a no-cache remote engine interface, according to some embodiments. As shown, multi-core, multi-threaded (MCMT) processor die 900 includes 8 cores, 904, 906, 908, 910, 912, 914, 916, and 918. Each of the cores has a core shadow tag. MCMT processor die 900 further includes a die shadow tag 920 and a no-cache remote (NCR) engine 902, which is capable of sending requests over network 903.

In some embodiments, the logical connection of the no-cache remote engine to the die shadow tag and its port out to the MCMT network. It is through this port that it will receive requests from remote dies, as well as issue load and store requests to memory—the usage of these requests is further described below.

Other than the addition of a ninth port, the functionality of the die shadow tag remains unchanged. The MOESI-F coherency protocol is followed. Non-conflicting requests are serviced from all ports in parallel, if requests from different ports have an address conflict, they are serialized based on core order (i.e. core 0, 1, 2, etc.). The no-cache remote engine will have lowest priority in these cases.

The NCR engine requires two new request types to be supported by the die shadow tag: Remote RD and Remote WR. These instructions will initiate functionality within the die shadow tag that varies only slightly from the currently supported flows. The functionality dictates that the die shadow tag will perform an address match of the contents of the domains it is managing. It is possible that multiple die sub-domains will hold the same cache line. If this is the case, the die shadow tag will have the lowest ordered sub-domain (domain ID 0, 1, 2, etc.) respond to the request. To avoid this scenario, software will be expected to properly manage memory that crosses within-die coherent sub-domain boundaries.

Remote-RD-Request Handling

Figure 10:
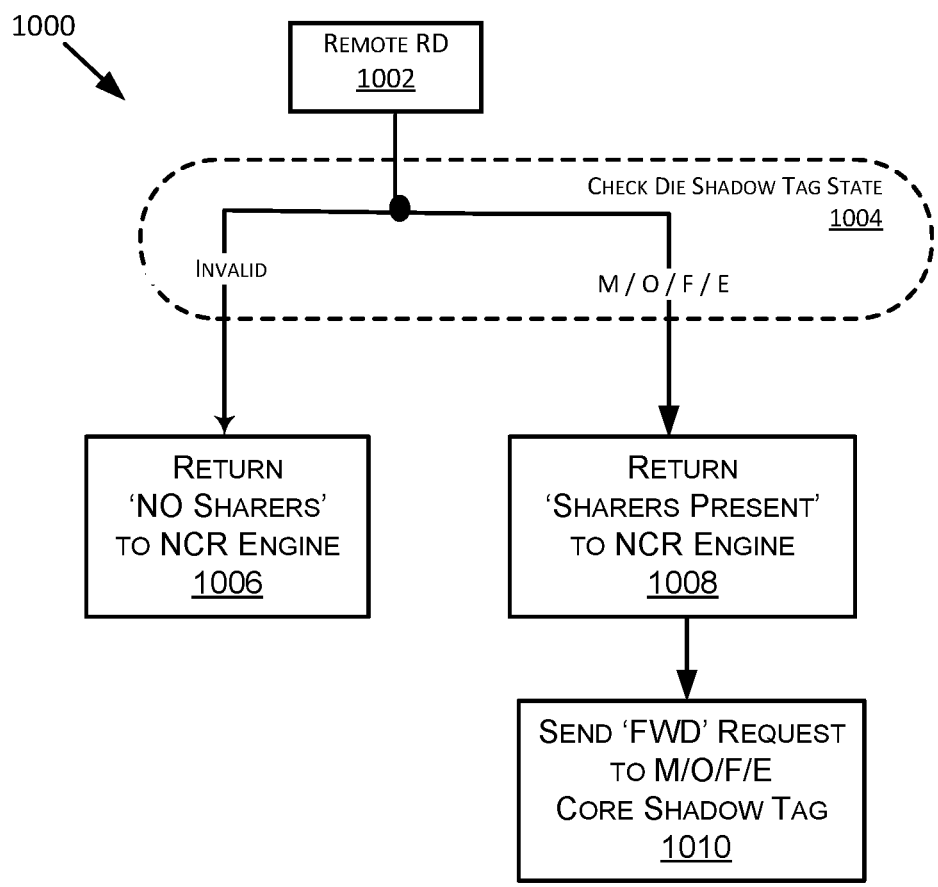
FIG. 10 is a block flow diagram illustrating a shadow tag flow when receiving a remote read request, according to some embodiments.

FIG. 10 is a block flow diagram illustrating a die shadow tag decision flow when responding to a remote read request received from an NCR engine, according to some embodiments. As shown, flow 1000 begins at 1002, when the die shadow tag receives a remote RD request from the NCR engine, the NCR engine having received the remote RD request over a network from a remote data cache pipeline of a remote die. For example, NCR engine 902 uses its dedicated port into die shadow tag 920 to forward the remote RD request, along with an identifier of the source of the request. As described above, in some embodiments, die shadow tag 920 has nine ports, allowing the eight cores and the NCR engine to access the die shadow tags in parallel. At 1004, the die shadow tag state of the requested address is checked.

If the line does not exist in the coherency domain (i.e., Invalid state), the die shadow tag at 1006 returns a "no-sharers exist" response to the NCR engine.

Otherwise, if the requested address does exist in the die domain, the MOESI-F protocol dictates that it will be in one of M, O, F, or E states. If the requested address is valid, the die shadow tag at 1008 returns a "sharers do exist" response to the NCR engine. The die shadow tag at 1010 will tell that owning cache to forward the cache line to the remote die's cache that made the no-cache remote RD request (the die shadow tag knows and tells the owning cache where to forward the data because the NCR engine receives a source address with the no-cache remote RD request, and forwards that source address to the die shadow tag along with the request). In that case, the die shadow tag will also inform the NCR engine that "sharers exist." Note, it is not possible for only S state core shadow tags to exist (i.e., a designated responder must exist).

Upon receiving a response from the die shadow tag, the no-cache remote (NCR) engine will proceed in one of two ways. If a "no-sharers" response is received, this indicates that the data must be fetched from memory. The NCR engine will send a load request to that memory location (on the same die), indicating that the return address will be the original remote data cache that made the request. The loaded data returning to that data cache will indicate the end of the operation. If a "sharers-exist" response is returned from the die shadow tag, the NCR engine is no longer needed, and will clear its slot. Here, the owning cache (M/O/E or F state) sends the data directly back to the remote requesting cache, the data arriving at that cache indicates the end of the operation.

Remote Write-Request Handling

Figure 11:
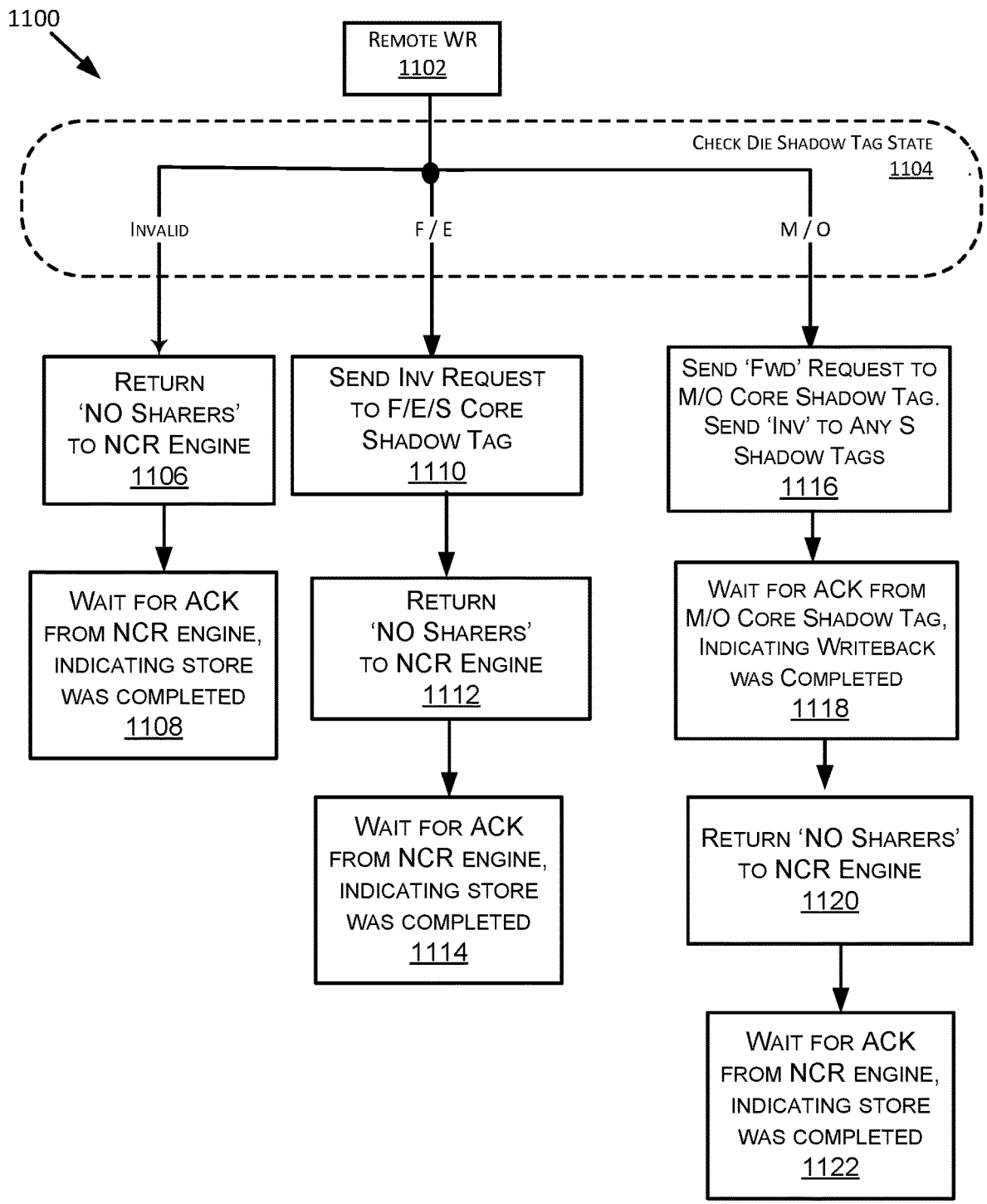
FIG. 11 is a block flow diagram illustrating a shadow tag flow when receiving a remote write request, according to some embodiments.

FIG. 11 is a block flow diagram illustrating a die shadow tag decision flow when responding to a remote write request received from an NCR engine, according to some embodiments. As shown, flow 1100 begins at 1102, when the NCR engine forwards a remote WR request to the die shadow tag, the NCR engine having received the remote WR request over a network from a remote data cache pipeline of a remote die. The die shadow tag at 1104 checks the die shadow tag state. If the cache line is invalid in the die's coherent domain, the die shadow tag at 1106 notifies the NCR engine (i.e., "no-sharers") and the store request is sent from the NCR engine to memory. The die shadow tag, in the interest of data correctness, at 1108 waits for an ACK (Acknowledgment) from the NCR engine indicating that the store was completed.

If the cache line is in the coherent domain in a clean state (F or E), then all shared cache lines are invalidated at 1110, and at 1112 a "no sharers" response is sent to the NCR engine, causing the NCR engine to send the store to memory. Then, like operation 1108, the die shadow tag at 1114 waits for an ACK from the NCR engine that the store was completed.

Finally, if the cache line is in the domain in a dirty state (M or O), then the M/O cache is directed at 1116 to write back the dirty line (invalidating the line in the cache), and all caches with the line (in S state) are invalidated. At 1118, similar to 1108 and 1114, waits for an ACK from the M/O caches that the writeback is complete. At 1120, the die shadow tag informs the NCR engine, who sends the store to the memory. The die shadow tag at 1122 then waits for an ACK from the NCR engine that the store was completed.

MOESI-F

FIG. 12 illustrates a state flow diagram for the MOESI-F (Modified Owned Exclusive Shared Invalid Forward) cache coherency protocol, according to some embodiments. The states included are M (Modified) 1202, O (Owned) 1204, F (Forward) 1206, E (Exclusive) 1208, S (Shared) 1210, and I (Invalid) 1212.

As shown, cache line data responses to read ("GetS") or write ("GetM") requests can come from caches in the E, F, O, or M states, via routes 1270, 1274, and 1288 from the E state, route 1290 from the F state, routes 1282 and 1292 from the O state, and route 1278 from the M state. In these states for each line, it is ensured that there is always a single responder for either type of request.

There are two states where an eviction of the cache line will leave only caches in the S state: F and O. Some embodiments respond to such cases by passing the state to one of the sharing caches, continuously ensuring that one cache will always serve as a designated responder. These are represented in FIG. 12 using the transitions from the S state labeled "FloatO 1262", "FloatF 1252", "FloatE 1260", and "FloatM 1266".

For example, consider the case where three caches have a clean line in S, with one cache having the line in F. If the cache with the line in F needs to evict, it will alert the sharing caches. The cache that is the most recent to enter the shared domain transitions its state to F, such as at 1252, and the evicted F cache changes its state to I, such as at 1294. In the situation where only one cache in S remains, that cache will instead transition to E to maintain consistency with the protocol and signify that no sharers remain.

An eviction of a line in O follows the same concept. When the cache in O is evicted, for example at 1292, one of the caches in S will transition to O, such as at 1262. If only one S cache exists, that cache will instead transition to M, such as at 1266, maintaining within the protocol that only a cache in M will write-back to memory if it is evicted, such as at 1278.

It can be observed that in this protocol, the O state serves as the F state for dirty data. All responses to read requests for shared data (GetS), will be handled by the O state (dirty) or the F state (clean). Since two sharing lines cannot exist in O and F together, if a cache in one of these states receives a GetS, it will instantly respond with the data. Additionally, transitions away from the O and F state are identical, as can be seen in FIG. 12. Because of this, and the identical process of passing the state to an S cache on an eviction, the complexity and implementation overhead of having both the F and O states is very small.

Properly following this protocol results in at least the following improvements to cache coherency protocols:

1. It is guaranteed only one cache responds to any given request, improving the feasibility of using this protocol for any implementation (snoop bus, directory, etc.).

2. A minimum number (2) of memory access cases exist: (1) A read-miss when the cache line does not currently exist in the coherency domain, and (2) a write-back on eviction of a cache line in M. This results in a performance improvement over existing protocols.

Determining Who Will Transition States

Implementing F or O state passing requires knowing which S cache is the one to transition states. Changes in S order must be monitored as caches enter (such as at 1256) and exit (such as at 1252 to F, 1258 to I, 1260 to E, 1262 to O, and 1264 or 1266 to M) the shared coherency domain. Additionally, the total number of S caches needs to be known, to determine if the transition needs to be made to O(dirty)/F(clean), or M(dirty)/E(clean) in the case that no other sharers remain.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
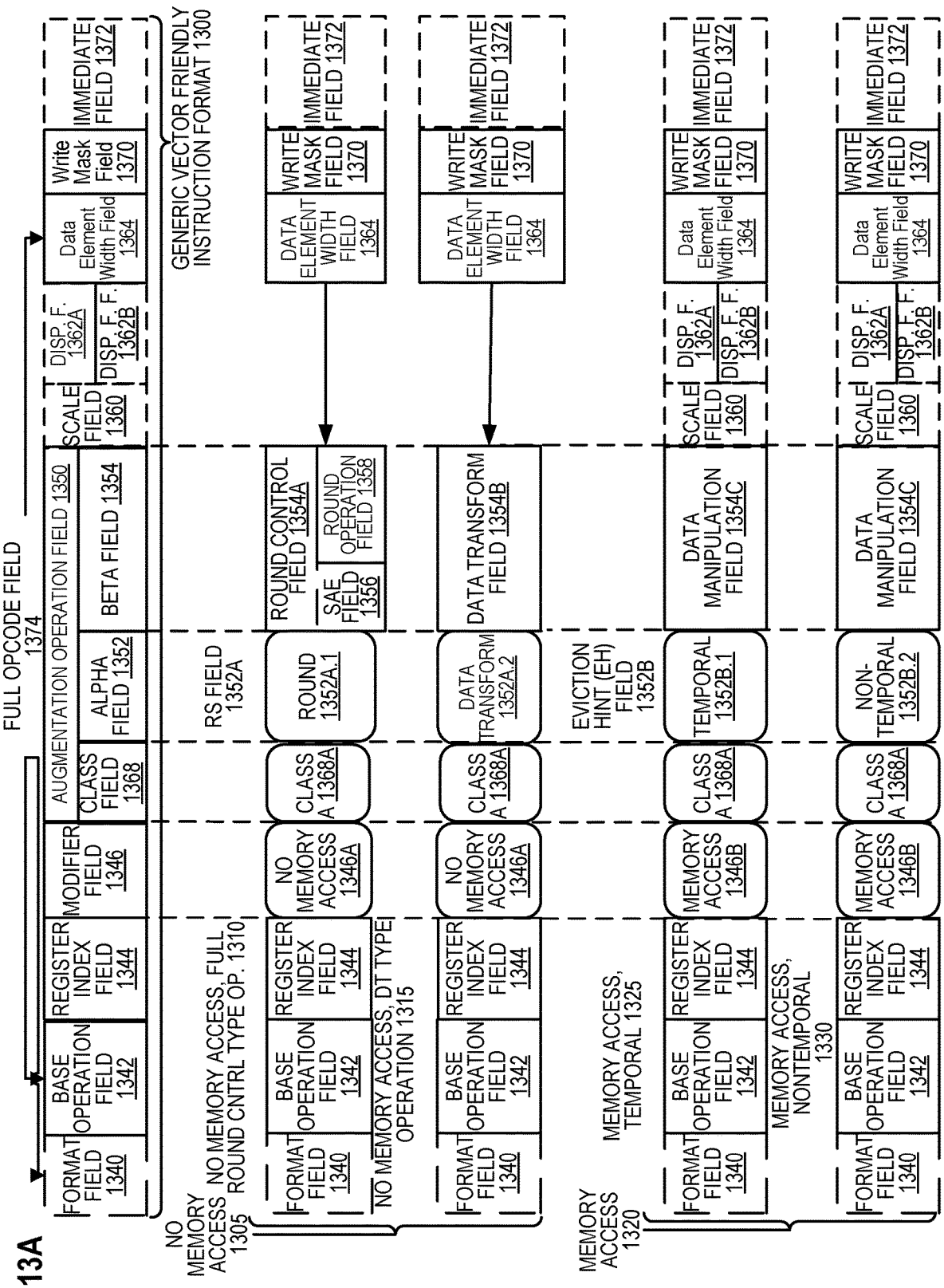
FIGS. 13A-13B are block diagrams illustrating a generic vector friendly instruction format and instruction templates thereof according to some embodiments of the invention.
Figure 13B:
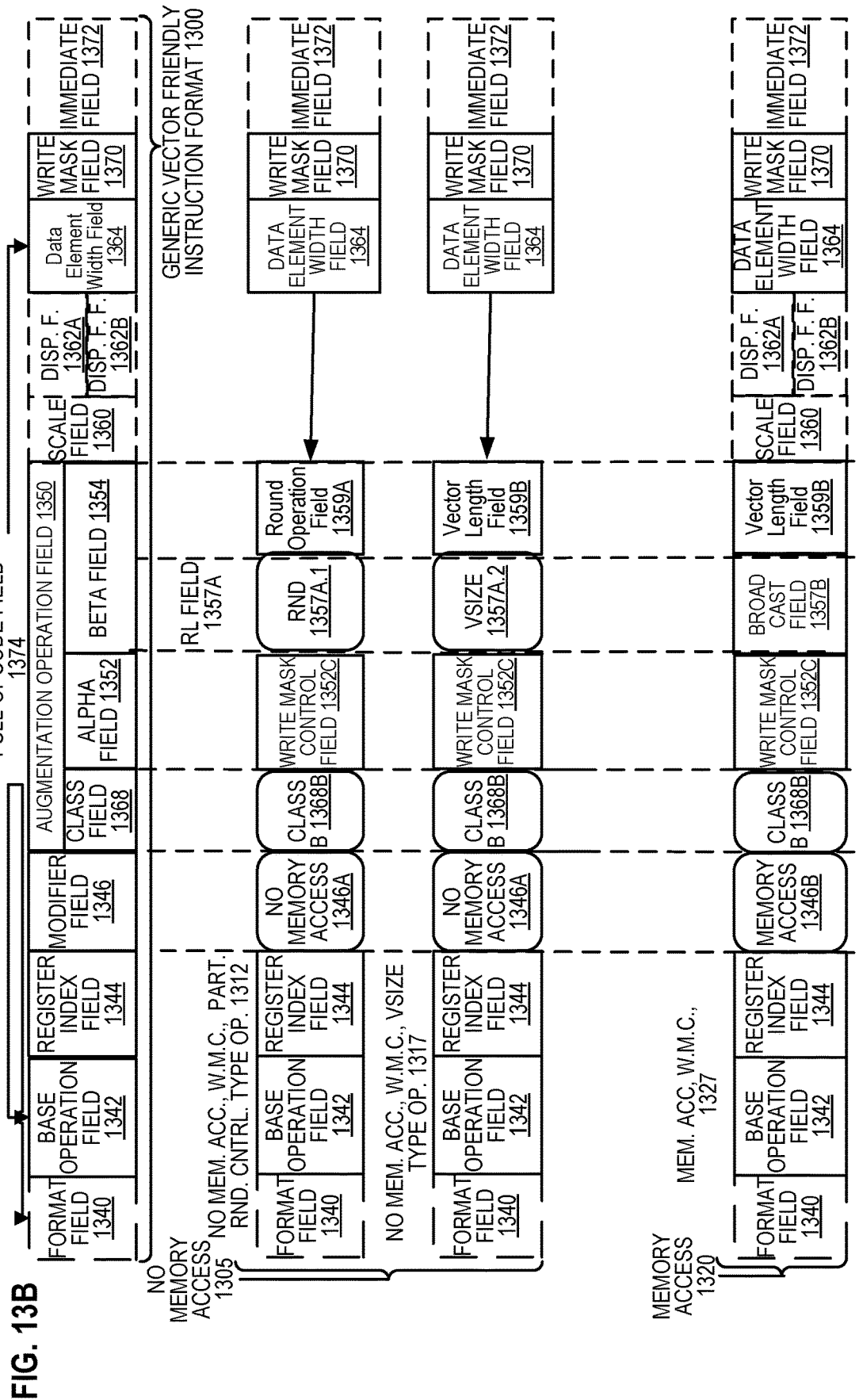

FIGS. 13A-13B are block diagrams illustrating a generic vector friendly instruction format and instruction templates thereof according to some embodiments of the invention. FIG. 13A is a block diagram illustrating a generic vector friendly instruction format and class A instruction templates thereof according to some embodiments of the invention; while FIG. 13B is a block diagram illustrating the generic vector friendly instruction format and class B instruction templates thereof according to some embodiments of the invention. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In some embodiments, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}*index+base$).

Displacement Field 1362A—its content is used as part of memory address generation (e.g., for address generation that uses $2^{scale}*index+base+displacement$).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments of the invention are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement factor field 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments of the invention the round control field 1354A includes a suppress all floating-point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating-point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In some embodiments where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement factor field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z)

field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement factor field 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating-point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In some embodiments where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement factor field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14A is a block diagram illustrating an exemplary specific vector friendly instruction format according to some embodiments of the invention. FIG. 14A shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, SIB field, displacement field, and immediate fields of the existing x86 instruction set with extensions. The fields from FIG. 13 into which the fields from FIG. 14A map are illustrated.

It should be understood that, although embodiments of the invention are described with reference to the specific vector friendly instruction format 1400 in the context of the generic vector friendly instruction format 1300 for illustrative purposes, the invention is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the invention is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402 is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in some embodiments).

The second-fourth bytes (EVEX Bytes 1-3) include a number of bit fields providing specific capability.

REX field 1405 (EVEX Byte 1, bits [7-5])—consists of an EVEX.R bit field (EVEX Byte 1, bit [7]-R), EVEX.X bit field (EVEX byte 1, bit [6]-X), and EVEX.B bit field (EVEX byte 1, bit [5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 1410A—this is the first part of the REX' field 1410 and is the EVEX.R' bit field (EVEX Byte 1, bit [4]-R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]-10m)—its content encodes an implied leading opcode byte (0F, 0F 38, or 0F 3).

Data element width field 1364 (EVEX byte 2, bit [7]-W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (1s complement) form. Depending on the instruction, an extra different EVEX bit field is used to extend the specifier size to 32 registers.

EVEX.U 1368 Class field (EVEX byte 2, bit [2]-U)—If EVEX.U=0, it indicates class A or EVEX.U0; if EVEX.U=1, it indicates class B or EVEX.U1.

Prefix encoding field 1425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]-SSS, also known as $EVEX.s_{2-0}$, $EVEX.r_{2-0}$, EVEX.rr1, EVEX.LL0, EVEX.LLB; also illustrated with βββ)—as previously described, this field is context specific.

REX' 1410B—this is the remainder of the REX' field 1410 and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]-kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand or be treated as an opcode extension and not used to encode any instruction operand. The role of R/M field 1446 may include the following: encoding the instruction operand that references a memory address or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1372 operates as previously described.

Full Opcode Field

FIG. 14B is a block diagram illustrating the fields of the specific vector friendly instruction format 1400 that make up the full opcode field 1374 according to some embodiments. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to some embodiments. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

Figure 14D:
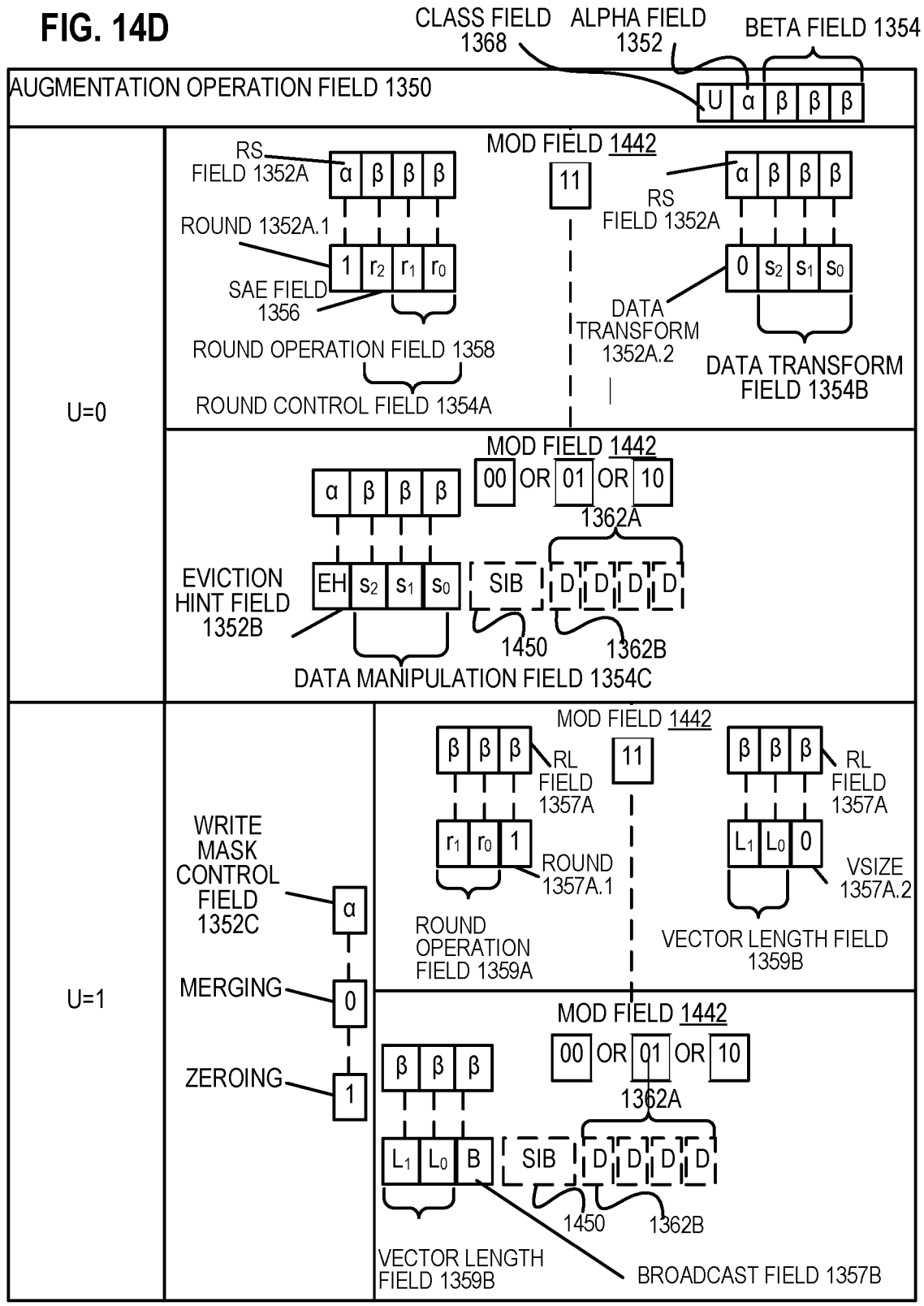
FIG. 14D is a block diagram illustrating the fields of the specific vector friendly instruction format that make up the augmentation operation field according to one embodiment.

FIG. 14D is a block diagram illustrating the fields of the specific vector friendly instruction format 1400 that make up the augmentation operation field 1350 according to some embodiments. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]-EH) is interpreted as the rs field 1352A. When the rs field 1352A contains a 1 (round 1352A.1), the beta field 1354 (EVEX byte 3, bits [6:4]-SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]-SSS) is interpreted as a three bit data transform field 1354B. When U=0 and the MOD field 1442 contains 00, 01, or 10 (signifying a memory access operation), the alpha field 1352 (EVEX byte 3, bit [7]-EH) is interpreted as the eviction hint (EH) field 1352B and the beta field 1354 (EVEX byte 3, bits [6:4]-SSS) is interpreted as a three bit data manipulation field 1354C.

When U=1, the alpha field 1352 (EVEX byte 3, bit [7]-EH) is interpreted as the write mask control (Z) field 1352C. When U=1 and the MOD field 1442 contains 11 (signifying a no memory access operation), part of the beta field 1354 (EVEX byte 3, bit [4]-$S_0$) is interpreted as the RL field 1357A; when it contains a 1 (round 1357A.1) the rest of the beta field 1354 (EVEX byte 3, bit [6-5]-$S_{2-1}$) is interpreted as the round operation field 1359A, while when the RL field 1357A contains a 0 (VSIZE 1357.A2) the rest of the beta field 1354 (EVEX byte 3, bit [6-5]-$S_{2-1}$) is interpreted as the vector length field 1359B (EVEX byte 3, bit [6-5]-$L_{1-0}$). When U=1 and the MOD field 1442 contains 00, 01, or 10 (signifying a memory access operation), the beta field 1354 (EVEX byte 3, bits [6:4]-SSS) is interpreted as the vector length field 1359B (EVEX byte 3, bit [6-5]-$L_{1-0}$) and the broadcast field 1357B (EVEX byte 3, bit [4]-B).

Exemplary Register Architecture

FIG. 15 is a block diagram of a register architecture 1500 according to some embodiments. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

| Adjustable Vector Length | Class | Operations | Registers |
|---|---|---|---|
| Instruction Templates that do not include the vector length field 1359B | A (FIG. 13A; U = 0) B (FIG. 13B; U = 1) | 1310, 1315, 1325, 1330 1312 | zmm registers (the vector length is 64 byte) zmm registers (the vector length is 64 byte) |
| Instruction templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating-point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating-point stack register file (x87 stack) 1545, on which is aliased the MMX packed integer flat register file 1550—in the embodiment illustrated, the x87 stack is an eight-element stack used to perform scalar floating-point operations on 32/64/80-bit floating-point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 16A is a block diagram illustrating both an exemplary in-order pipeline and an exemplary register renaming, out-of-order issue/execution pipeline according to some embodiments of the invention. FIG. 16B is a block diagram illustrating both an exemplary embodiment of an in-order architecture core and an exemplary register renaming, out-of-order issue/execution architecture core to be included in a processor according to some embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s)

1660 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 17B:
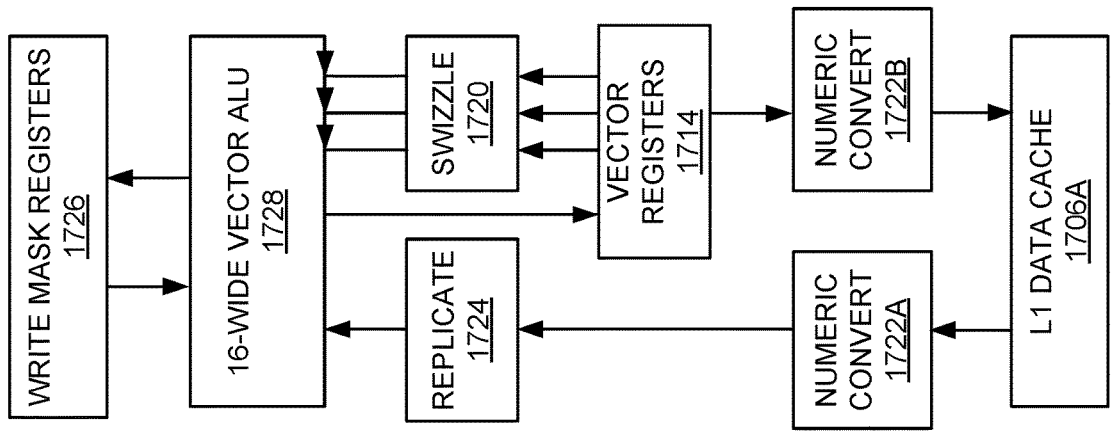
FIGS. 17A-B illustrate a block diagram of a more specific exemplary in-order core architecture, which core would be one of several logic blocks (including other cores of the same type and/or different types) in a chip.
Figure 17A:
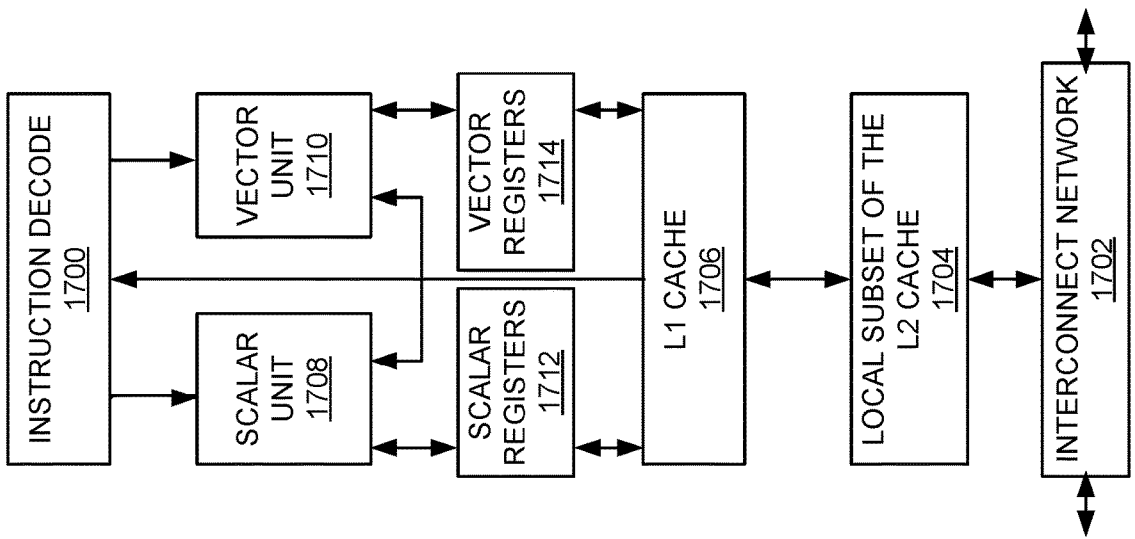

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to some embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to some embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Figure 18:
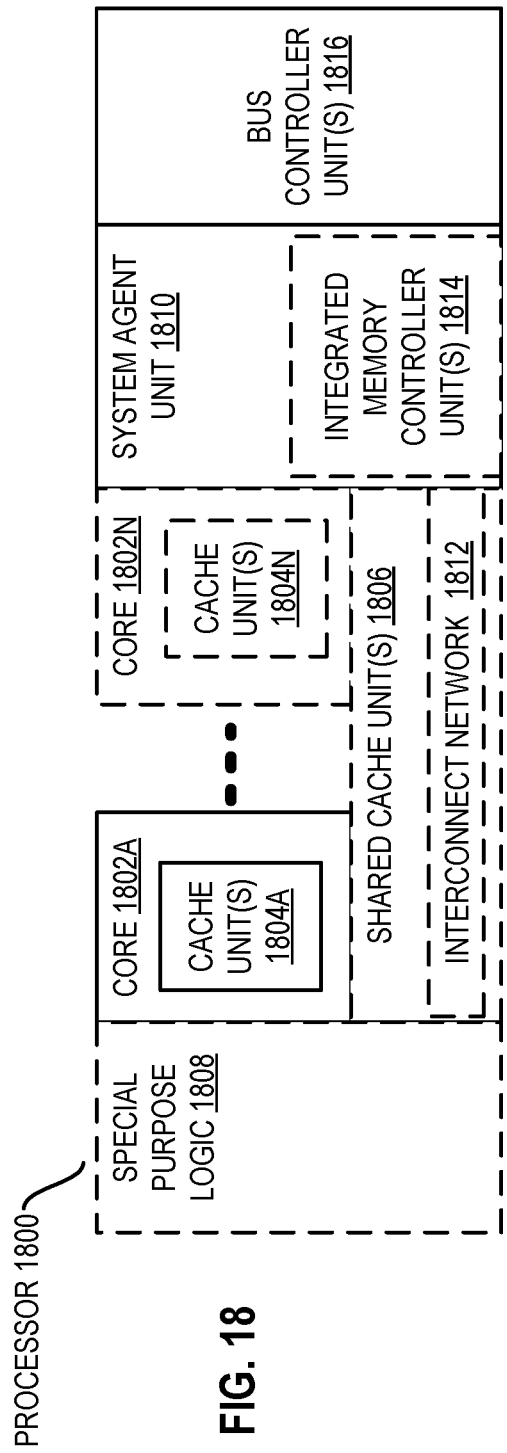
FIG. 18 is a block diagram of a processor that may have more than one core, may have an integrated memory controller, and may have integrated graphics according to some embodiments.

FIG. 18 is a block diagram of a processor 1800 that may have more than one core, may have an integrated memory controller, and may have integrated graphics according to some embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor, or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808 (integrated graphics logic 1808 is an example of and is also referred to herein as special purpose logic), the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
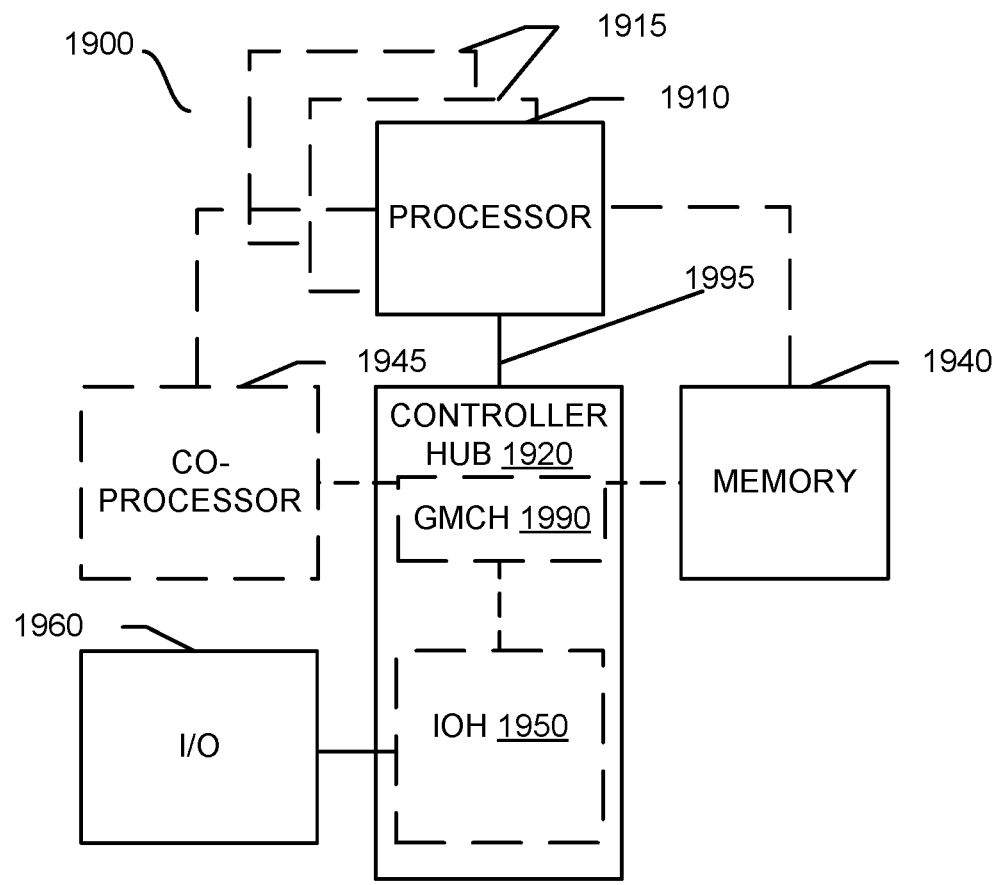
FIGS. 19-22 are block diagrams of exemplary computer architectures.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instruction's.

Figure 20:
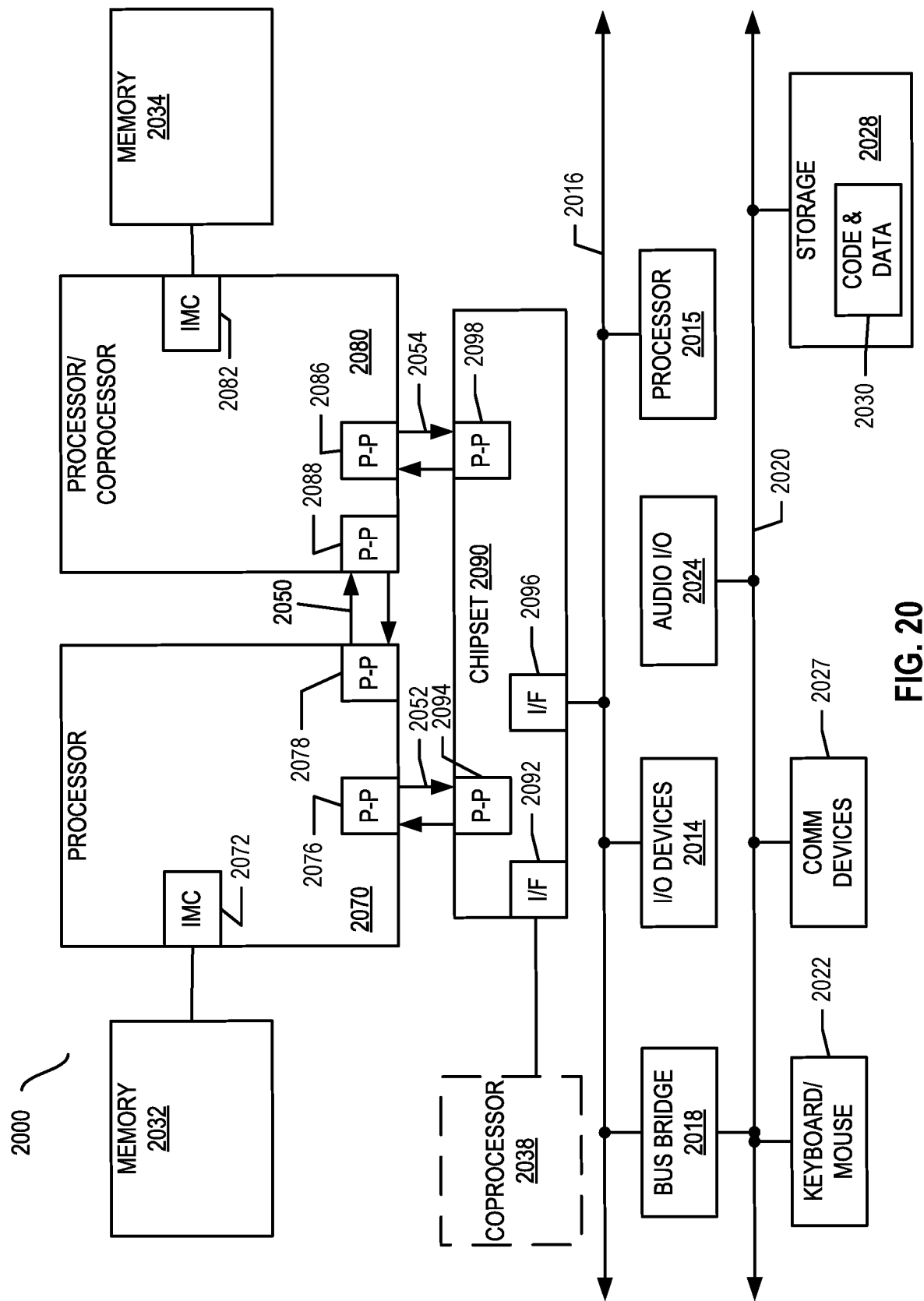

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In some embodiments, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072, and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2092. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
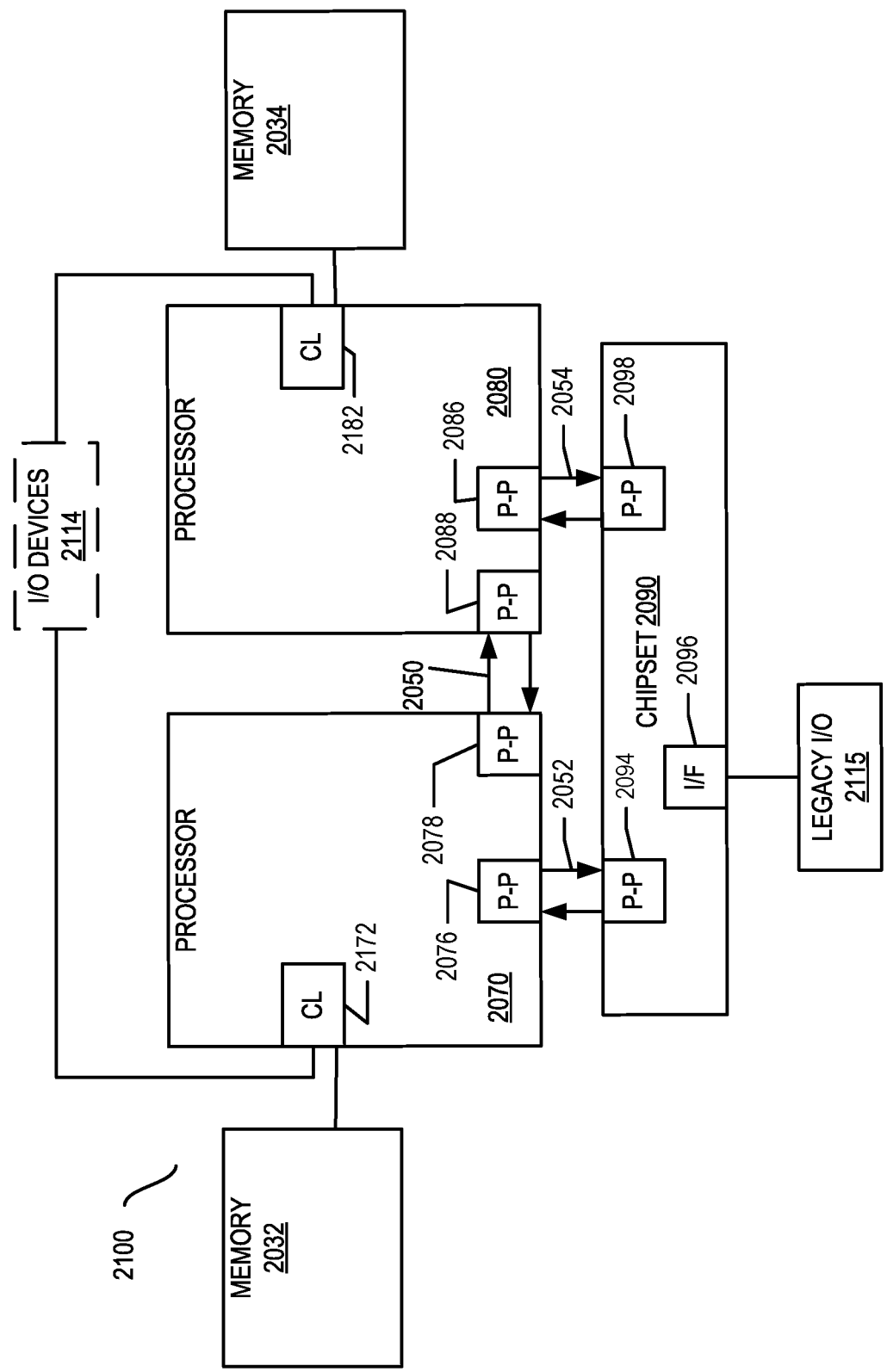

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2172 and 2182, respectively. Thus, the CL 2172, 2182 include integrated memory controller units and include I/O control logic. FIG. 21 illustrates that not only are the memories 2032, 2034 coupled to the CL 2172, 2182, but also that I/O devices 2114 are also coupled to the control logic 2172, 2182. Legacy I/O devices 2115 are coupled to the chipset 2090.

Figure 22:
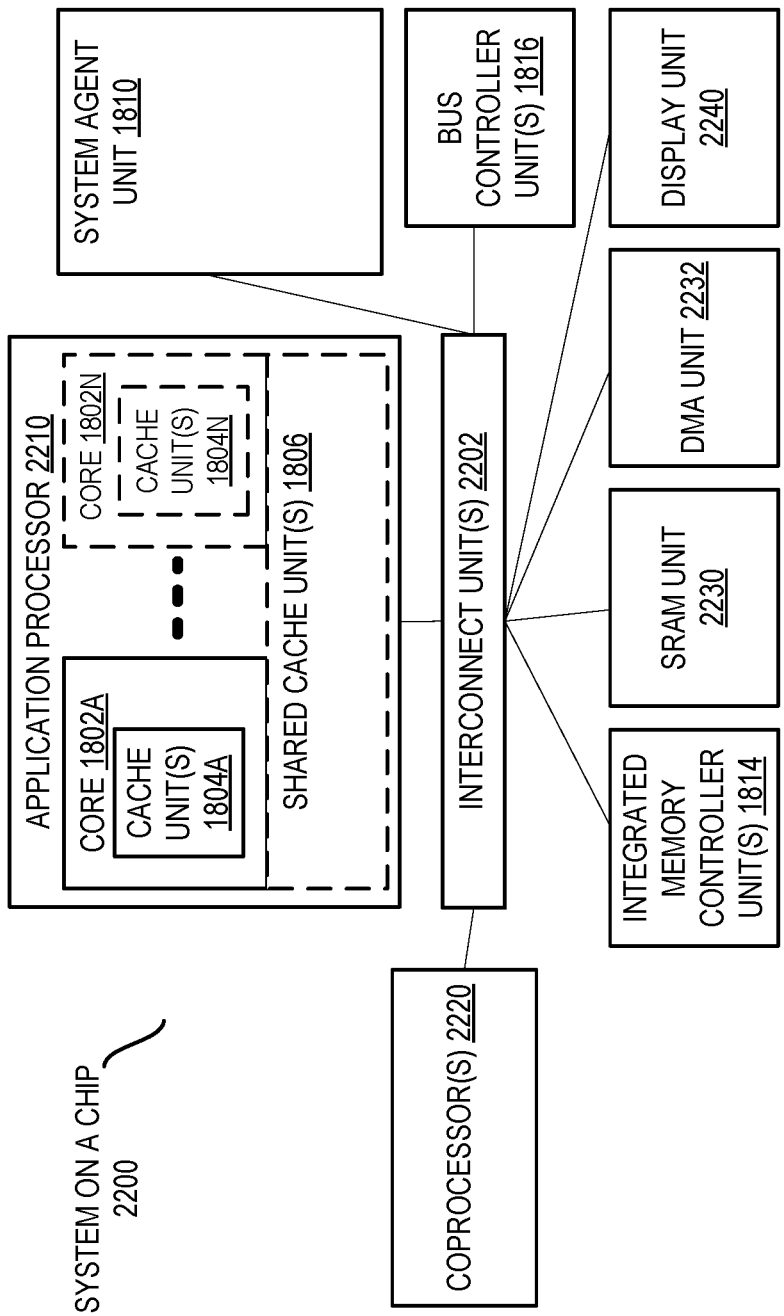

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 1802A-N, which include cache units 1804A-N, and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example: a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
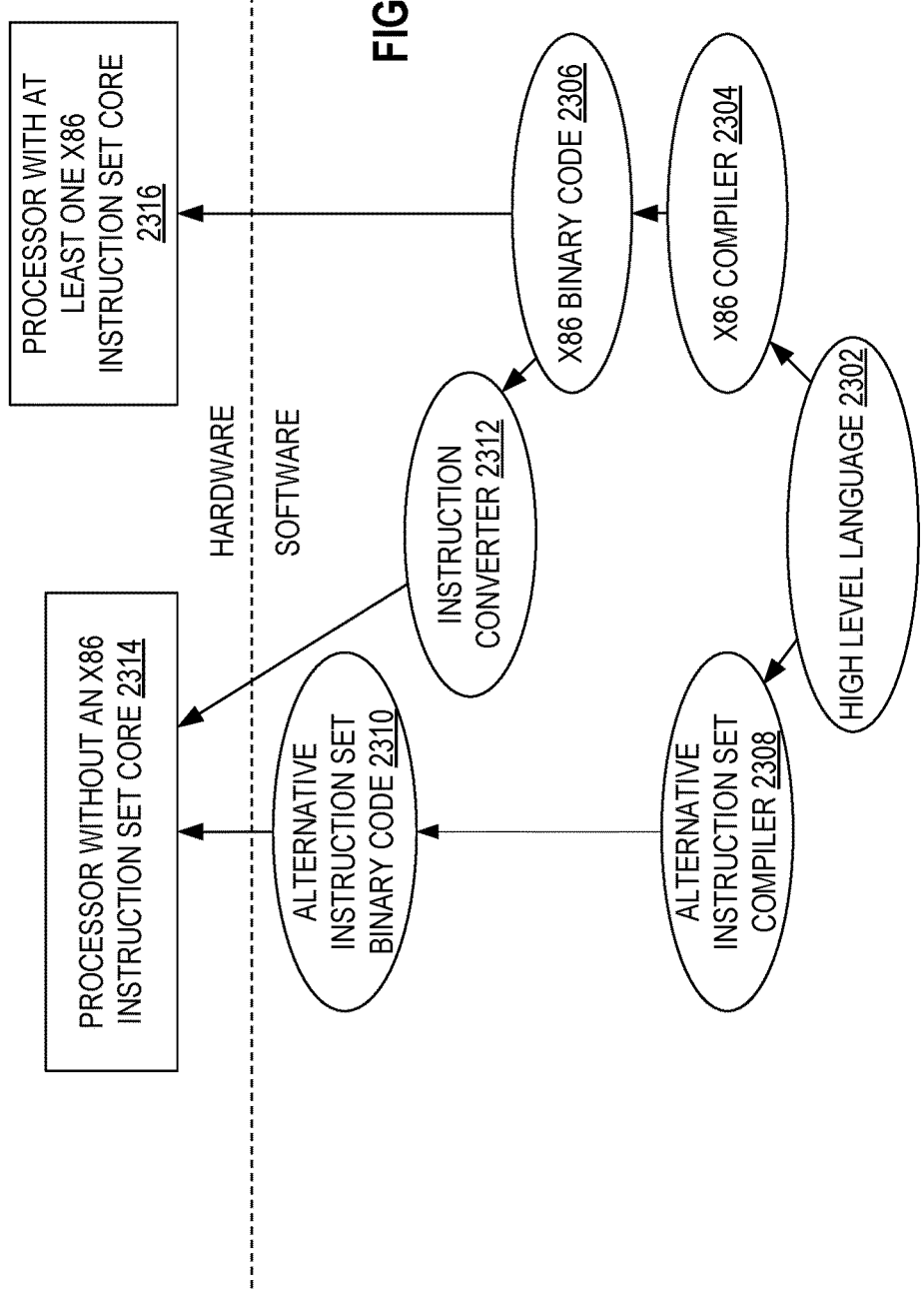
FIG. 23 is a block diagram contrasting the use of a software instruction converter to convert binary instructions in a source instruction set to binary instructions in a target instruction set according to some embodiments.

FIG. 23 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation, or any other process, allows a processor or other electronic device that does not have an x86 instruction set processor or core to execute the x86 binary code 2306.

Further Examples

Example 1 provides an exemplary system including: R racks, each rack including N nodes, each node including D dies, each die including C cores and a die shadow tag array, each core including P pipelines and a core shadow tag array, each pipeline associated with a data cache and a data cache tag array; and each data cache being either non-coherent or coherent, each coherent cache being associated with one of X coherency domains, and having cache lines with a modified, owned, exclusive, shared, invalid, or forward (MOESI-F) state, wherein each pipeline, when needing to read a cache line, issues a read request to its associated data cache, then, if need be, issues a read request to its associated core-level cache, then, if need be, issues a read request to its associated die-level cache, then, if need be, issues a no-cache remote read request to one of the D dies being mapped to hold the cache line.

Example 2 includes the substance of the exemplary system of Example 1, wherein participation in coherency by each of the C cores and each of the P pipelines is specified by a software-programmable model-specific register (MSR), and wherein, for each of the P pipelines participating in coherency, a domain ID of a corresponding coherent domain is also specified in the MSR; and wherein the core shadow tag, when servicing the transition request, attempts to conserve power by only reading core shadow tag array entries that match the domain ID.

Example 3 includes the substance of the exemplary system of Example 1, wherein each of the P pipelines, when reading a cache line, reads the cache line from its associated data cache when the cache line is in any of the M, O, E, S, and F states, and, otherwise, sends a request to read the cache line to its core shadow tag.

Example 4 includes the substance of the exemplary system of Example 1, wherein each of the P pipelines, when writing a cache line, writes the cache line in its associated data cache when the cache line is M state; otherwise, when the cache line is in E state, sends and awaits acknowledgment of a request to upgrade to E state to its core shadow tag; otherwise, when the cache line is in I state, sends and awaits acknowledgement of a request to write the cache line to its core shadow tag, Example 5 includes the substance of the exemplary system of Example 1, wherein each of the P pipelines, when issuing an EVICT; determines that no eviction is needed when the cache line is in I state.

Example 6 includes the substance of the exemplary system of Example 1, wherein if the address is not local to the data cache's die, the core shadow tag is to send a data access request as a no-cache remote request to the remote die's die-level shadow tag.

Example 7 includes the substance of the exemplary system of Example 1, wherein each of the C cores, in response to a request to access a cache line having an I state, forwards the request to its associated die-level shadow tag.

Example 8 includes the substance of the exemplary system of Example 1, wherein D equals 16, C equals 8, P equals 6, and X equals Example 3.

Example 9 provides an exemplary method including: initializing a system including R racks, each rack including N nodes, each node including D dies, each die including C cores and a die shadow tag array; each core including P pipelines and a core shadow tag array, each pipeline associated with a data cache and a data cache tag array, each data cache being either non-coherent or coherent, each coherent cache being associated with one of X coherency domains, and having cache lines with a modified, owned, exclusive, shared, invalid, or forward (MOESI-F) state, issuing, by a first pipeline, a request to read a cache line from its associated data cache, then, if need be, issuing a read request to its associated core-level cache, then, if need be, issuing a read request to its associated die-level cache; then, if need be, issuing a remote read request to a die mapped to the cache line.

Example 10 includes the substance of the exemplary method of Example 9, wherein participation in coherency by each of the C cores and each of the P pipelines is specified by a software-programmable model-specific register (MSR), and wherein, for each of the P pipelines participating in coherency, a domain ID of a corresponding coherent domain is also specified in the MSR; and wherein the core shadow tag, when servicing the transition request, attempts to conserve power by only reading core shadow tag array entries that match the domain ID.

Example 11 includes the substance of the exemplary method of Example 9, wherein the associated core-level cache, when servicing the read request, attempts to reduce power consumption and latency by only accessing core-level tags belonging to a same coherency domain as the requested cache line.

Example 12 includes the substance of the exemplary method of Example 9, wherein each of the P pipelines, when reading a cache line, reads the cache line from its associated data cache when the cache line is in any of the M, O, E, S, and F states, and, otherwise, sends a request to read the cache line to its core shadow tag.

Example 13 includes the substance of the exemplary method of Example 9, wherein each of the P pipelines, when writing a cache line, writes the cache line in its associated data cache when the cache line is M state, otherwise, when the cache line is in E state, sends and awaits acknowledgment of a request to upgrade to E state to its core shadow tag; otherwise, when the cache line is in I state, sends and awaits acknowledgement of a request to write the cache line to its core shadow tag.

Example 14 includes the substance of the exemplary method of Example 9, wherein each of the P pipelines, when issuing an EVICT, determines that no eviction is needed when the cache line is in I state.

Example 15 includes the substance of the exemplary method of Example 9, wherein if the address is not local to the data cache's die, the core shadow tag is to send a data access request as a no-cache remote request to the remote die's die-level shadow tag.

Example 16 includes the substance of the exemplary method of Example 9, wherein each of the C cores, in response to a request to access a cache line having an I state, forwards the request to its associated die-level shadow tag.

Example 17 includes the substance of the exemplary system of Example 9, wherein D equals 16, C equals 8, P equals 6, and X equals 3.

Example 18 provides an exemplary non-transitory machine-readable medium containing instructions to which a processor responds by: Initializing a system including R racks, each rack housing N nodes, each node incorporating D dies, each die containing C cores, each core including: P pipelines, each associated with a data cache and a corresponding tag array to store a modified, owned, exclusive, shared, invalid, or forward (MOESI-F) state for each data cache line, wherein each of the P pipelines is to use its data cache according to a MOESI-F protocol, and wherein each data cache is either non-coherent or is shared with one or more other of the P pipelines in one of X coherency domains; and a core shadow tag to track the state of coherent cache lines in the P data caches, wherein each pipeline, when needing to read a cache line, issues a read request to its associated data cache, then, if need be, issues a read request to its associated core-level cache, then, if need be, issues a read request to its associated die-level cache, then, if need be, issues a no-cache remote read request to a target die being mapped to hold the cache line.

Example 19 includes the substance of the exemplary non-transitory machine-readable medium of Example 18, wherein participation in coherency by each of the C cores and each of the P pipelines is specified by a software-programmable model-specific register (MSR), and wherein, for each of the P pipelines participating in coherency, a domain ID of a corresponding coherent domain is also specified in the MSR; and wherein the core shadow tag, when servicing the transition request, attempts to conserve power by only reading core shadow tag array entries that match the domain ID.

Example 20 includes the substance of the exemplary non-transitory machine-readable medium of Example 18, wherein the associated core-level cache, when servicing the read request, attempts to reduce power consumption and latency by only accessing core-level tags belonging to a same coherency domain as the requested cache line.

What is claimed is:

1. A system comprising:
R racks, each rack comprising N nodes;
each node comprising D dies;
each die comprising C cores and a die shadow tag array;
each core comprising P pipelines and a core shadow tag array;
each pipeline associated with a data cache and a data cache tag array;
each data cache being either non-coherent or coherent; and
each coherent cache being associated with one of X coherency domains, and having cache lines with a modified, owned, exclusive, shared, invalid, or forward (MOESI-F) state;
wherein each pipeline, when needing to read a cache line, issues a read request to its associated data cache, then, if need be, issues a read request to its associated core-level cache, then, if need be, issues a read request to its associated die-level cache, then, if need be, issues a no-cache remote read request to one of the D dies being mapped to hold the cache line.

2. The system of claim 1, wherein participation in coherency by each of the C cores and each of the P pipelines is specified by a software-programmable model-specific register (MSR), and wherein, for each of the P pipelines participating in coherency, a domain ID of a corresponding coherent domain is also specified in the MSR; wherein one of the P pipelines, when needing to transition a cache line state from a read to a write, sends a transition request to the core shadow tag, and wherein the core shadow tag, when servicing the transition request, attempts to conserve power by only reading core shadow tag array entries that match the domain ID.

3. The system of claim 1, wherein each of the P pipelines, when reading a cache line, reads the cache line from its associated data cache when the cache line is in any of the M, O, E, S, and F states, and, otherwise, sends a request to read the cache line to its core shadow tag.

4. The system of claim 1, wherein each of the P pipelines, when writing a cache line, writes the cache line in its associated data cache when the cache line is M state; otherwise, when the cache line is in E state, sends and awaits acknowledgment of a request to upgrade to E state to its core shadow tag; otherwise, when the cache line is in I state, sends and awaits acknowledgement of a request to write the cache line to its core shadow tag.

5. The system of claim 1, wherein each of the P pipelines, when issuing an EVICT, determines that no eviction is needed when the cache line is in I state.

6. The system of claim 1, wherein if an address associated with the read request is not local to the die associated with the data cache, the pipeline is to send a data access request as a no-cache remote request to the remote die, the no-cache remote request to be handled by a no-cache remote engine of the remote die.

7. The system of claim 1, wherein each of the C cores, in response to a request to access a cache line having an I state, forwards the request to its associated die-level shadow tag.

8. The system of claim 1, wherein D equals 16, C equals 8, P equals 6, and X equals 3.

9. A method comprising:
   initializing a system comprising R racks, each rack comprising N nodes, each node comprising D dies, each die comprising C cores and a die shadow tag array, each core comprising P pipelines and a core shadow tag array, each pipeline associated with a data cache and a data cache tag array, each data cache being either non-coherent or coherent, each coherent cache being associated with one of X coherency domains, and having cache lines with a modified, owned, exclusive, shared, invalid, or forward (MOESI-F) state;
   issuing, by a first pipeline, a request to read a cache line from its associated data cache;
   then, if need be, issuing a read request to its associated core-level cache;
   then, if need be, issuing a read request to its associated die-level cache; and
   then, if need be, issuing a remote read request to a die mapped to the cache line.

10. The method of claim 9, wherein participation in coherency by each of the C cores and each of the P pipelines is specified by a software-programmable model-specific register (MSR), and wherein, for each of the P pipelines participating in coherency, a domain ID of a corresponding coherent domain is also specified in the MSR; wherein each pipeline, when needing to read a cache line, issues a read request to its associated data cache, then, if need be, issues a read request to its associated core-level cache, then, if need be, issues a read request to its associated die-level cache, then, if need be, issues a no-cache remote read request to one of the D dies being mapped to hold the cache line.

11. The method of claim 9, wherein the associated core-level cache, when servicing the read request, attempts to reduce power consumption and latency by only accessing core-level tags belonging to a same coherency domain as the requested cache line.

12. The method of claim 9, wherein each of the P pipelines, when reading a cache line, reads the cache line from its associated data cache when the cache line is in any of the M, O, E, S, and F states, and, otherwise, sends a request to read the cache line to its core shadow tag.

13. The method of claim 9, wherein each of the P pipelines, when writing a cache line, writes the cache line in its associated data cache when the cache line is the M state; otherwise, when the cache line is in E state, sends and awaits acknowledgment of a request to upgrade to E state to its core shadow tag; otherwise, when the cache line is in I state, sends and awaits acknowledgement of a request to write the cache line to its core shadow tag.

14. The method of claim 9, wherein each of the P pipelines, when issuing an EVICT, determines that no eviction is needed when the cache line is in I state.

15. The method of claim 9, wherein if an address associated with the read request is not local to the die associated with the data cache, the pipeline is to send a data access request as a no-cache remote request to the remote die, the no-cache remote request to be handled by a no-cache remote engine of the remote die.

16. The method of claim 9, wherein each of the C cores, in response to a request to access a cache line having an I state, forwards the request to its associated die-level shadow tag.

17. The system of claim 9, wherein D equals 16, C equals 8, P equals 6, and X equals 3.

18. A non-transitory machine-readable medium containing instructions to which a processor responds by:
   initializing a system comprising R racks, each rack housing N nodes, each node incorporating D dies, each die containing C cores, each core comprising:
      P pipelines, each associated with a data cache and a corresponding tag array to store a modified, owned, exclusive, shared, invalid, or forward (MOESI-F) state for each data cache line, wherein each of the P pipelines is to use its data cache according to a MOESI-F protocol, and wherein each data cache is either non-coherent or is shared with one or more other of the P pipelines in one of X coherency domains; and
      a core shadow tag to track a state of coherent cache lines in the P data caches;
   wherein each pipeline, when needing to read a cache line, issues a read request to its associated data cache, then, if need be, issues a read request to its associated core-level cache, then, if need be, issues a read request to its associated die-level cache, then, if need be, issues a no-cache remote read request to a target die being mapped to hold the cache line.

19. The non-transitory machine-readable medium of claim 18, wherein participation in coherency by each of the C cores and each of the P pipelines is specified by a software-programmable model-specific register (MSR), wherein each pipeline, when needing to read a cache line, issues a read request to its associated data cache, then, if need be, issues a read request to its associated core-level cache, then, if need be, issues a read request to its associated die-level cache, then, if need be, issues a no-cache remote read request to one of the D dies being mapped to hold the cache line.

20. The non-transitory machine-readable medium of claim 18, wherein the associated core-level cache, when servicing the read request, attempts to reduce power consumption and latency by only accessing core-level tags belonging to a same coherency domain as the requested cache line.

\* \* \* \* \*